United States Patent
Sugiyama et al.

(10) Patent No.: US 7,212,321 B2
(45) Date of Patent: May 1, 2007

(54) SIMPLE AND COMPACT AUTOMATIC DOCUMENT FEED DEVICE CONTAINING A SINGLE ADJUSTING UNIT

(75) Inventors: Akihiko Sugiyama, Chiba (JP); Osamu Jinza, Yamanashi (JP); Motoaki Nakayama, Yamanashi (JP); Akiharu Higaki, Yamanashi (JP); Masataka Hamada, Yamanashi (JP)

(73) Assignee: Nisca Corporation, Minamikoma-gun (JP)

( * ) Notice: Subject to any disclaimer, the term of this patent is extended or adjusted under 35 U.S.C. 154(b) by 342 days.

(21) Appl. No.: 09/877,019

(22) Filed: Jun. 11, 2001

(65) Prior Publication Data

US 2002/0030321 A1   Mar. 14, 2002

(30) Foreign Application Priority Data

Jun. 13, 2000   (JP)   ............................. 2000-176862
Jun. 13, 2000   (JP)   ............................. 2000-176879

(51) Int. Cl.
*H04N 1/04*   (2006.01)
(52) U.S. Cl. ........................ 358/498; 358/400; 355/23; 399/306; 271/186
(58) Field of Classification Search ................ 358/498, 358/450, 408, 474, 448, 296, 482, 494; 399/361, 399/364, 367, 370, 371, 372, 373, 376, 306; 271/186, 240, 242; 355/23
See application file for complete search history.

(56) References Cited

U.S. PATENT DOCUMENTS 5,390,033 A * 2/1995 Bannai et al. ............... 358/498
6,161,831 A * 12/2000 Kusakabe et al. .......... 271/186

FOREIGN PATENT DOCUMENTS

JP   8-133551   5/1996

* cited by examiner

*Primary Examiner*—Thomas D. Lee
*Assistant Examiner*—Heather D Gibbs
(74) *Attorney, Agent, or Firm*—Westerman, Hattori, Daniels & Adrian, LLP.

(57) ABSTRACT

An automatic document feed device having reading means for stopping a conveyed document to a reading position on a platen and sequentially reading images of two sides of the document one side by one, includes an adjusting unit, provided upstream of the reading position on the platen, for adjusting an edge of the document, wherein the adjusting unit have a function for adjusting the edge of the document which is fed to read one side, and for reversing the document through the platen and adjusting the edge of the document which is fed again to read the other side of the document. A feed unit includes one of feed guide members and a feed roller in the feed path. The feed path unit is rotatably supported, thereby enabling the feed path to open.

13 Claims, 19 Drawing Sheets

SIMPLE AND COMPACT AUTOMATIC DOCUMENT FEED DEVICE CONTAINING A SINGLE ADJUSTING UNIT

BACKGROUND OF THE INVENTION

1. Field of the Invention

The present invention relates to an automatic document feed device in an image reading apparatus and, more particularly, to an automatic document feed device having a conveyer path in which documents are discharged one by one, automatically fed to an image reading position, thereafter, reversed, and fed again to the image reading position so as to read out images of two sides of the document.

2. Description of the Related Prior Art

In automatic document feed devices used for image forming apparatuses such as a copying machine, facsimile, and image scanner, at least one document set in a feed tray is automatically fed to an image reading unit and is discharged into the feed tray after completing the image reading operation. In general, adjusting means for correcting a skew of the document is provided in a conveyer path ranging from the feed tray to the image reading unit. More specifically, a pair of rollers is provided in the conveyer path ranging from the feed tray to the image reading unit, and the adjusting means corrects the skew of the document in a conveying direction thereof by nipping a predetermined amount of the edge of the document during the stop state of the pair of rollers.

FIG. 25 shows a conventional automatic document feed device which has been proposed, capable of reading images of double sides of document. In the proposed automatic document feed device, a large-sized conveyer roller 101 carries documents discharged from a feed tray 100 to an document reading unit 102 which is opposed to reading means 111 in an image reading apparatus main body 110. Then, the reading means 111 in the document reading unit 102 reads out a front side of the document. The document is reversed through a switch-back path 103 which is arranged onto the downstream, and the reversed document is carried on a peripheral surface of the conveyer roller 101 again, thereby reading the rear surface of the document. Further, the document of which front and rear sides are read is reversed through the switch-back path 103 and the document reading unit 102, and is discharged on a discharge tray 104 so as to sequentially arrange pages in order upon discharging the documents.

In the automatic document feed apparatus 110, the document reeled from the feed tray 100 is nipped between a pair of rollers 106 by using a feed roller 105 arranged upstream so as to correct the skew of the document. Then, the edge of the document is abutted to a roller 107 pressed against the conveyer roller 101 by using the switch-back roller 108 while carrying the document whose front side is read from the switch-back path 103 to the document reading unit 102, thereby correcting the skew of the document.

An example of the above-mentioned automatic document feed devices is disclosed in Japanese Unexamined Patent Application Publication No. 8-133551. In this disclosure, an document on the feed tray 100 is fed onto a platen and is shifted on the platen. Reading means stopped downstream of the platen reads out an image of the front side of the document. The document after the reading operation on the platen is switched back on a discharge tray and is reversed and supplied again on the platen. The back-side image of the document is read. The discharge tray is arranged downstream of the feed tray and the document is switched back between the feed tray and the discharge tray, thus reducing in size of the automatic document feed device.

However, in the above conventional automatic document feed device, a position of the document fed from the feed tray 100 is provided independently of that to correct the document which is fed to the document reading unit 102 again via the switch-back path 103 after reading the front side of the document by the document reading unit 102. Therefore, a feed path is prolonged and the device has a large size. As a result, the structure becomes complicated.

Also, in the above-mentioned conventional document feed devices, a jammed document in a feed path is removed by opening/closing a part of the feed path, excluding a drive roller, etc., ranging from the feed tray to the platen. The automatic document feed device is opened/closed to the platen and, thereby, the jammed document is removed from a conveyer and discharge path.

However, the device disclosed in the Japanese Patent Application Publication No. 8-133551 has a problem in that the jammed document cannot be easily removed depending on a position of the jammed document because a conveyer path of the document is complicated. In particular, in case of jammed document having a short length in the conveying direction, frequently, only a part of the document is exposed and is sandwiched between a pair of rollers, as components forming the conveyer path, for moving the document. Even if the exposed part can be caught, the document is frequently broken to be forcedly pull out because the document is nipped between the rollers.

Further, it has been extremely difficult to remove the document jammed in a re-feed path which includes a switchback path to change the direction of the document move in order to feed the other surface of the document onto the platen again by turning over the document, because the document is not exposed at all in the re-feed path (referred often as "a switch-back path" thereafter).

As described above, to remove the jammed document in the cycle path for feeding the document again by switching the document to back, a part of the path is opened/closed. However, since feed means such as the feed rollers cannot be arranged to the feed path in the upper direction of the opened/closed cycle, the feed means must be disposed while preventing the upstream of the opened/closed cycle path so as to have the above structure. Consequently, there is a problem in that the device becomes large-sized.

SUMMARY OF THE INVENTION

It is an object of the present invention to provide an automatic document feed device with a simple structure and a compact size that resets a status of a document nipped between a pair of resist rollers for carrying and sending the document, and facilitates an operation for pulling out a jammed document without damaging it, if the document is jammed at any position in a document transmitting path.

Accordingly, according to a first aspect of the present invention, there is provided an automatic document feed device having reaming means for stopping a document to be conveyed at a reading position on a platen and sequentially reading images of two sides of the document one side by one, comprising: adjusting means, provided upstream of the reading position on the platen, for adjusting an edge of the document, wherein the adjusting means has functions for adjusting the edge of the document which is fed to read one side of the document, and reversing the document through the platen and adjusting the edge of the document which is fed again to read the other side of the document.

Herein, the adjusting means comprises a first resist roller and a second resist roller, whereby rotation for conveyance of the document and stop for the adjustment are controlled. The document is abutted at a nip portion between the pair of resist rollers, thereby adjusting the document.

According to a second aspect of the present invention, there is also provided an automatic document feed device for reading one side of an a document to be conveyed, reversing and re-feeding the document onto a platen, and reading the other side of the document at a reading position on the platen, comprising: a feed tray for setting the document; a feed path for feeding the document on the feed tray to the platen; first and second resist rollers, provided on the document feed path, for adjusting the edge of the document the first and second resist rollers guided in the feed path; a conveyer path, connected to the document feed path, for conveying the fed document at the reading position of the platen; and a switch-back path for reversing the conveying direction of the document passing through the platen and guiding the document to the first and second resist rollers, wherein the first and second resist rollers adjust the edge of the document guided in the switch-back path and re-feeds the document to the platen. Herein, the feed path is overlappingly provided above the switch-back path.

According to a third aspect of the present invention, there is further provided an automatic document feed device for reading one side of a document to be conveyed, reversing and re-feeding the document onto a platen, and reading the other side of the document at a reading position on the platen, comprising: a feed tray for setting a document; a feed path for guiding the document on the feed tray to a platen; feed means for feeding the document along the document feed path; a conveyer path, connected to the document feed path, for guiding the fed document at the reading position on the platen; conveying means for conveying the document on the platen along the feed path; a switch-back path for reversing the conveying direction of the document passing through the platen and guiding the document to the feed path; a switch-back roller, provided to the switch-back path; and adjusting means, provided near the downstream of a junction point of the switch-back path, for adjusting the edge of the document guided by the feed means and adjusting the edge of the document guided in the switch-back path.

DESCRIPTION OF THE PREFERRED EMBODIMENTS

Hereinbelow, an automatic document feed device according to the present invention will be described in detail with reference to the drawings.

Figure 1:
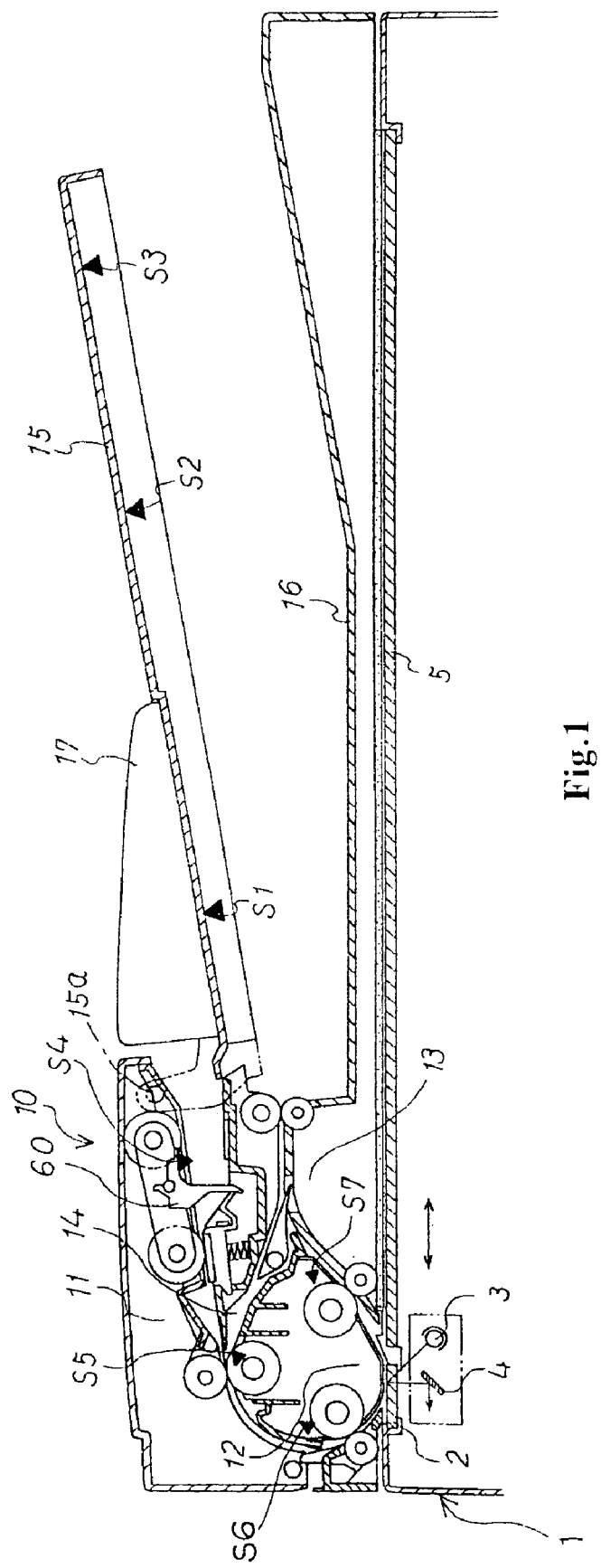
FIG. 1 is a vertical cross-sectional view of an automatic document feed device in an image reading apparatus according to the present invention.
Figure 2:
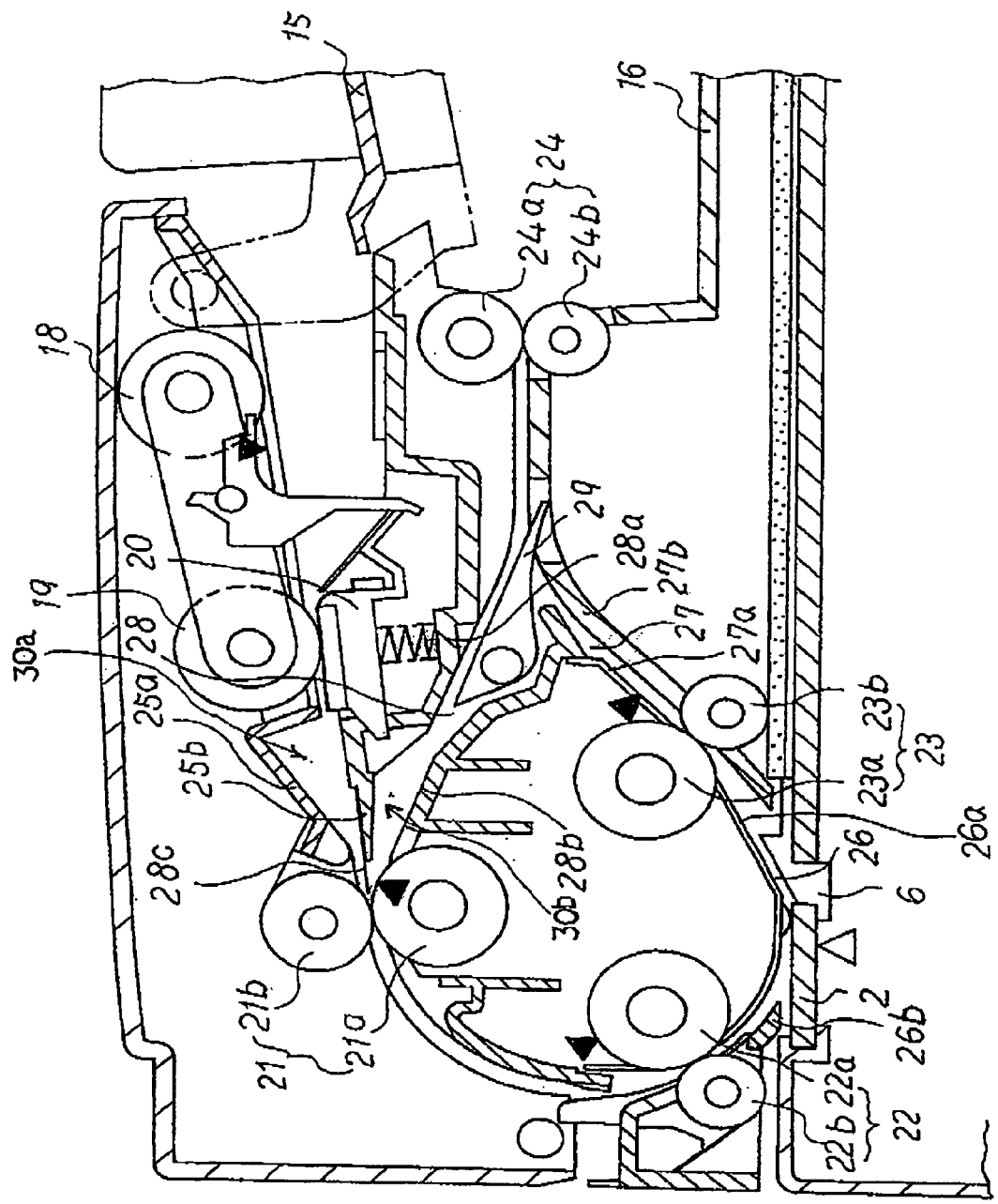
FIG. 2 is an enlarged vertical cross-sectional view of the automatic document feed device shown in FIG. 1.

FIG. 1 is a vertical cross-sectional view showing an automatic document feed device provided in an image reading apparatus according to the present invention. FIG. 2 is an enlarged vertical-sectional view showing a main portion in the automatic document feed device in FIG. 1.

Referring to FIG. 1, reference numeral 10 denotes an automatic document feed device provided in an image reading apparatus main body 1, and functions to convey a document to pass through an upper surface of a contact glass 2 in the image reading apparatus main body 1. In the image reading apparatus main body 1, light from a light source 3 such as a lamp is irradiated through the contact glass 2 and its reflection light is reflected on a mirror 4. Thereby, reading means such as a CCD reads out an image of the document by photoelectrically converting the reflected light of the document.

That is, the upper surface of the contact glass 2 forms a reading unit. Incidentally, the image reading apparatus main body 1 further comprises a contact glass 5 having an area capable of placing the document. The automatic document feed device 10 is opened, and the document is placed on the contact glass 5. The image of the placed document can be read through the contact glass 5 by shifting a light source unit comprising the light source 3, the mirror 4, etc. in a sub-scan direction.

The automatic document feed device 10 comprises: a feed tray 15 on which a plurality of documents can be set; a feed unit (feed means) 11 for separating the documents on the feed tray 15 one by one and feeding each document to the contact glass 2; a conveyer unit 12 for transmitting the document along the upper surface of the contact glass 2; a discharge unit 13 for receiving the document transmitted through the upper surface of the contact glass 2 and discharging it; and a discharge tray 16 for enclosing the document that is discharged from the discharge unit 13, of which the image is read out. Further, the automatic document feed device 10 comprises a switch-back unit 14 in which the discharge unit 13 switches back the document discharged from the upper surface of the contact glass 2, and the document is transmitted to the feed unit 11 again and is fed onto the upper surface of the contact glass 2. Herein, the feed tray 15 is arranged to ensure a space over the discharge tray 16 with a certain degree of an inclined angle.

A side guide 17 controls the side portion of the documents set on the feed tray 15 and a stopper 60 controls the edge portion of the documents. The feed tray 15 is rotatably mounted on an edge portion 15a of the set document as a fulcrum.

The feed unit 11 comprises a reel roller 18, capable of elevating, which falls down, comes into contact with the uppermost document on the feed tray 15, and thus reels out the document; separate means having a feed roller 19 for feeding the document reeled from the reel roller 18 and a separate pat 20 for transmitting only one uppermost document and preventing the document sequential to a second-uppermost document to be fed; and a pair of resist rollers 21 for abutting the edge of one document which is separated by the separating means, adjusting it, and transmitting it downstream. The document is fed along a feed path 25.

Downstream the feed roller 19, the edge of the document is abutted to the pair of resist rollers 21 and thus is bent (a loop is formed). A first loop space 30a is provided to receive the loop of the document. The document is abutted at a nip portion between the pair of the resist rollers 21 and a flection is formed. Thereby, the edge of the document is adjusted and the document is carried to prevent it from being transmitted in the inclined direction.

Figure 3:
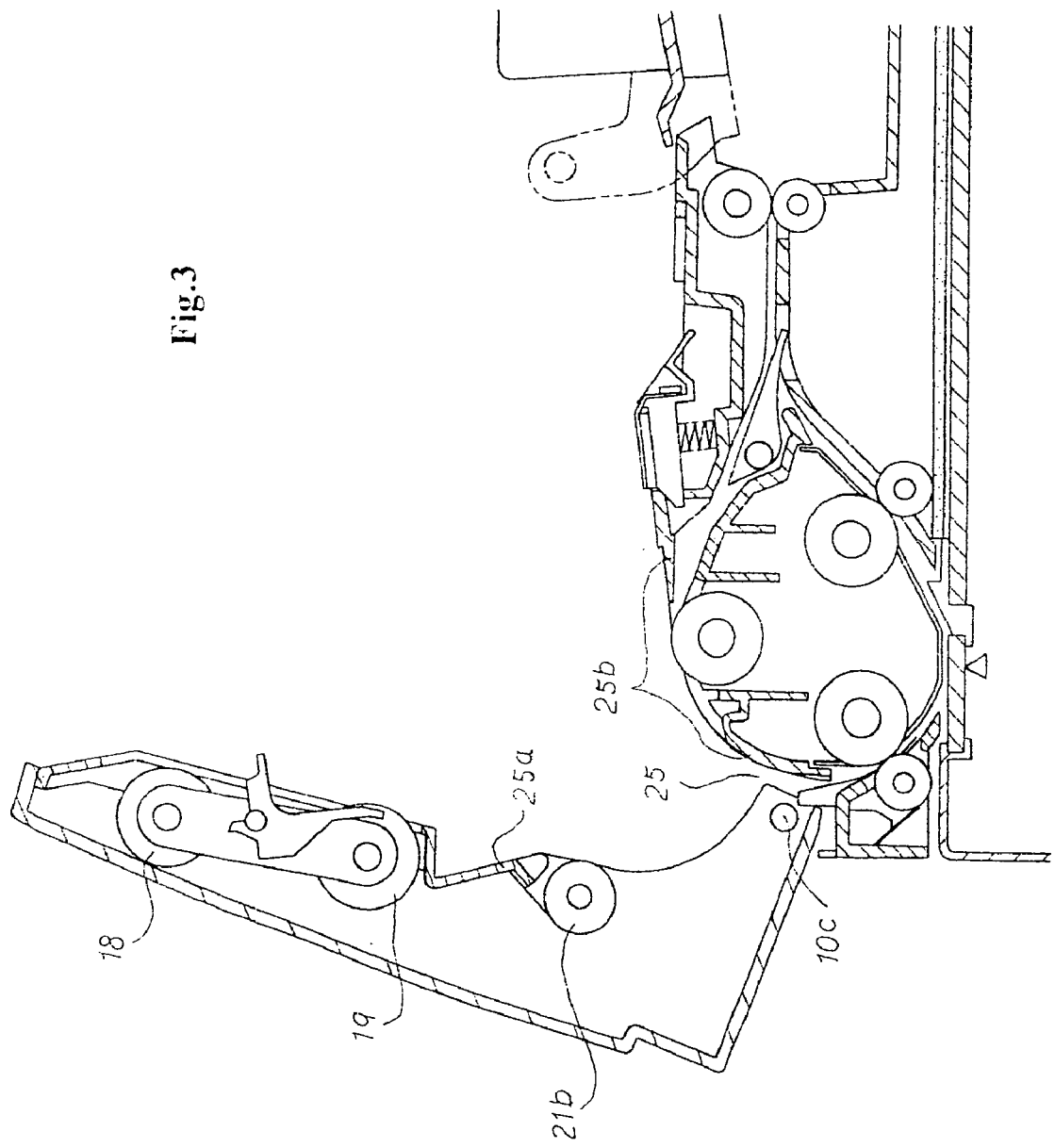
FIG. 3 is a diagram showing a status upon opening an document conveyer path in the automatic document feed device shown in FIG. 1.

As shown in FIG. 3, the feed path 25 comprises an up-guide plate 25a and a down guide for feed 25b which are opposed each other. The up-guide plate 25a is fixed to a casing 10a which is rotatably supported to a rotational fulcrum 10c, and it is opened/closed by integral rotation with the casing 10a in the counterclockwise direction. To the casing 10a, arranged are the reel roller 18, the feed roller 19, a follower roller 21b of the pair of the resist rollers 21b, and a stopper 60. All of them are integrally rotated. Thus, the jammed document can be easily removed by entirely opening the feed path 25 from a feed port of the feed tray 15 to the contact glass 2 to be continuously exposed.

The conveyer unit 12 comprises: a pair of conveyer rollers 22 for supplying the document to the contact glass 2 to a portion in the up direction of the contact glass 2; and a pair of conveyer rollers 23 for discharging the document from the contact glass 2 to a portion in the down direction of the contact glass 2. The document is conveyed along a conveyer path 26 formed of the contact glass 2, a scoop guide 6 on the image reading apparatus main body 1 side, and a back-up guide 26a on the automatic document feed device 10.

The discharge unit 13 and the switch-back unit 14 shares a part of the discharge tray 16. A pair of discharge rollers 24 for discharging the document to the discharge tray 16 is provided to the shared portion. In a double-side mode, which will be described later, the pair of discharge rollers 24 is controlled to switch the document back in the nipped state of the bottom-edge of the document by their reverse rotation and controlled to transmit the document to the feed unit 11. Further, the pair of discharge rollers 24 comprise a discharge drive roller 24a and a discharge follower roller 24b which are apart from each other to convey the document without fail, when the document is circulated from the switch-back unit 14 through the document feed unit 11 and the conveyer unit 12 and the top and bottom edges of the document cross. A flapper 29 for guiding the document to the feed unit 11 is provided at the shared portion of the discharge unit 13 and the switch-back unit 14. The flapper 29 is always energized downward by an energizing spring (not shown). When the document is sent to the pair of discharge rollers 24 along the discharge path 27, the discharge rollers 24 are pressed up by the edge of the discharged document to allow the document to be transmitted. When the document is switched back by the pair of the discharge rollers 24, they exist downward and close the discharge path 27, thereby guiding the document to the switch-back path 28.

The discharge path 27 comprises: a discharge up-guide 27a which is formed by extending the back-up guide 26a provided opposed to the contact glass 2; and a discharge guide 27b, made up of resin, which is formed integrally with the discharge tray 16. The switch-back path 28 comprises an up guide for switch back 28a and a down guide for switch back 28b which are continuously provided to an document-guiding surface of the flapper 29, and both of them guide the document to the nip portion of the pair of resist rollers 21.

As mentioned above, a first loop space 30a is arranged downstream of the feed roller 19 to receive the flection (loop). Further, a second loop space 30b is arranged to the switch-back path 28 to form the flection of the document by abutting the edge of the document guided, through the switch-back path 28, to the pair of the resist rollers 21. The document is abutted at the nip portion between the pair of the resist rollers 21, thus forming the flection. Then, the edge of the document is adjusted and a skew is removed. The document can be accurately nipped at the nip portion of the pair of the resist rollers 21 by a press force due to the flection of the document.

The aforementioned first loop space 30a and second loop space 30b are formed to bend the document to the outside.

Moreover, the switch-back path 28 is joined the feed path 25 at the nip portion of the pair of the resist rollers 21. The pair of the resist rollers 21 adjusts the document fed through the feed path 25 and the document re-fed through the switch-back path 28. As described above, the adjusting positions of the document (in the pair of the resist rollers 21) are commonly used, consequently, the document feed path in the overall device is simplified and becomes compact, and an operation for controlling the conveyance of the document is also simple.

The switch-back path 28 is jointed to the feed path 25 at the nip portion of the pair of the resist rollers 21. A mylar 28*c* is extended to the conjunction position to introduce the document to the nip portion of the pair of the resist rollers 21.

Figure 4:
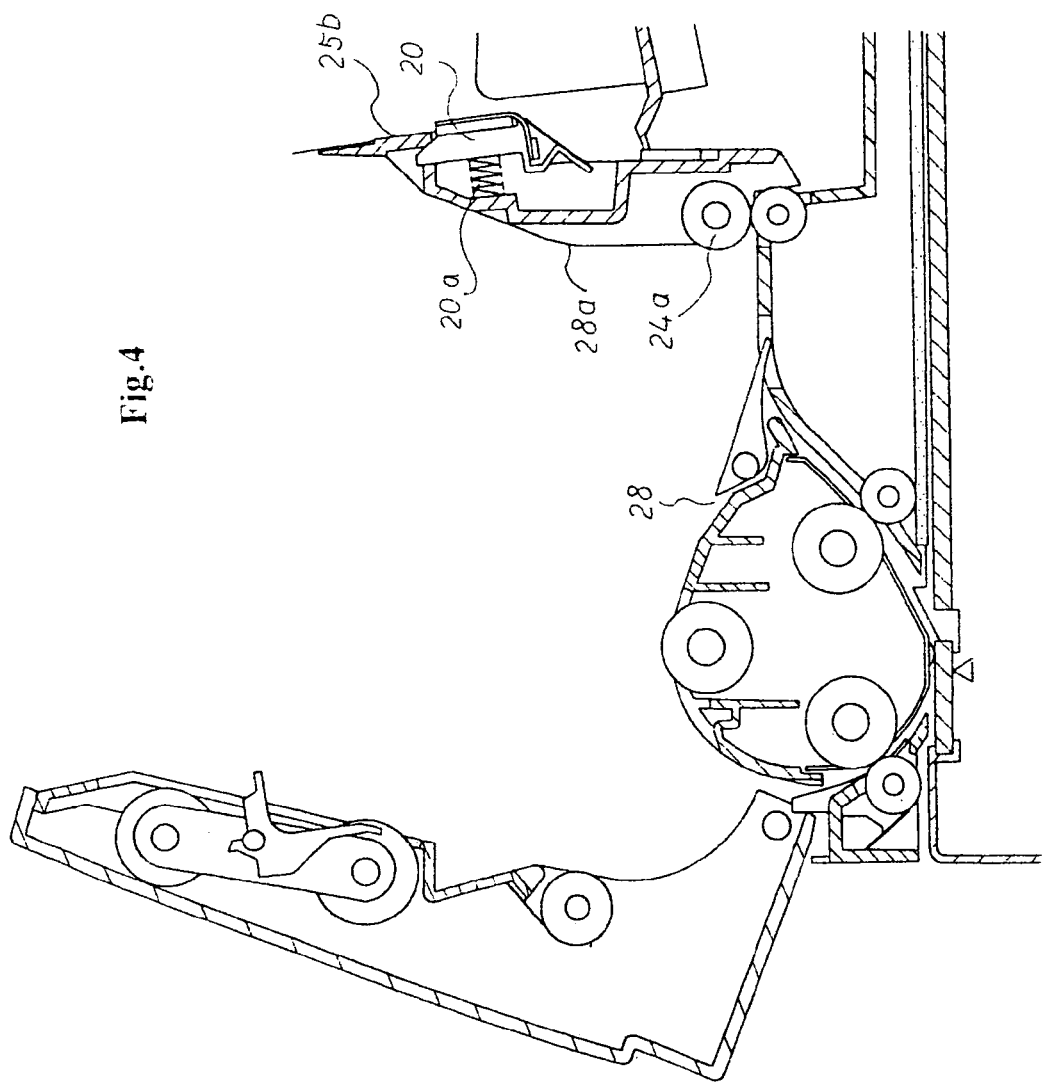
FIG. 4 is a diagram showing a status upon opening the document conveyer path in the automatic document feed device shown in FIG. 1.

Here, the up guide for switch back 28*a* is formed integrally with the down guide for feed 25*b* as shown in FIG. 4. The integrated guides are rotatably supported in the clockwise direction with a rotational axis of the discharge drive roller 24*a* as a fulcrum. The separate pat 20 and the energizing spring 20*a* of the separating pat 20 are attached to the guides formed integrally with the up guide for switch back 28*a* and the down guide for feed 25*b*, thus realizing the integral rotation. The switch-back path 28 from the pair of discharge rollers 24 to the pair of resist rollers 21 is entirely opened to be sequentially exposed. Therefore, the jammed document can be easily removed.

Only if the casing 10*a* opens the feed path 25, the switch-back path 28 can be opened. Therefore, a proper process can be performed depending on the position of the jammed document.

Figure 5:
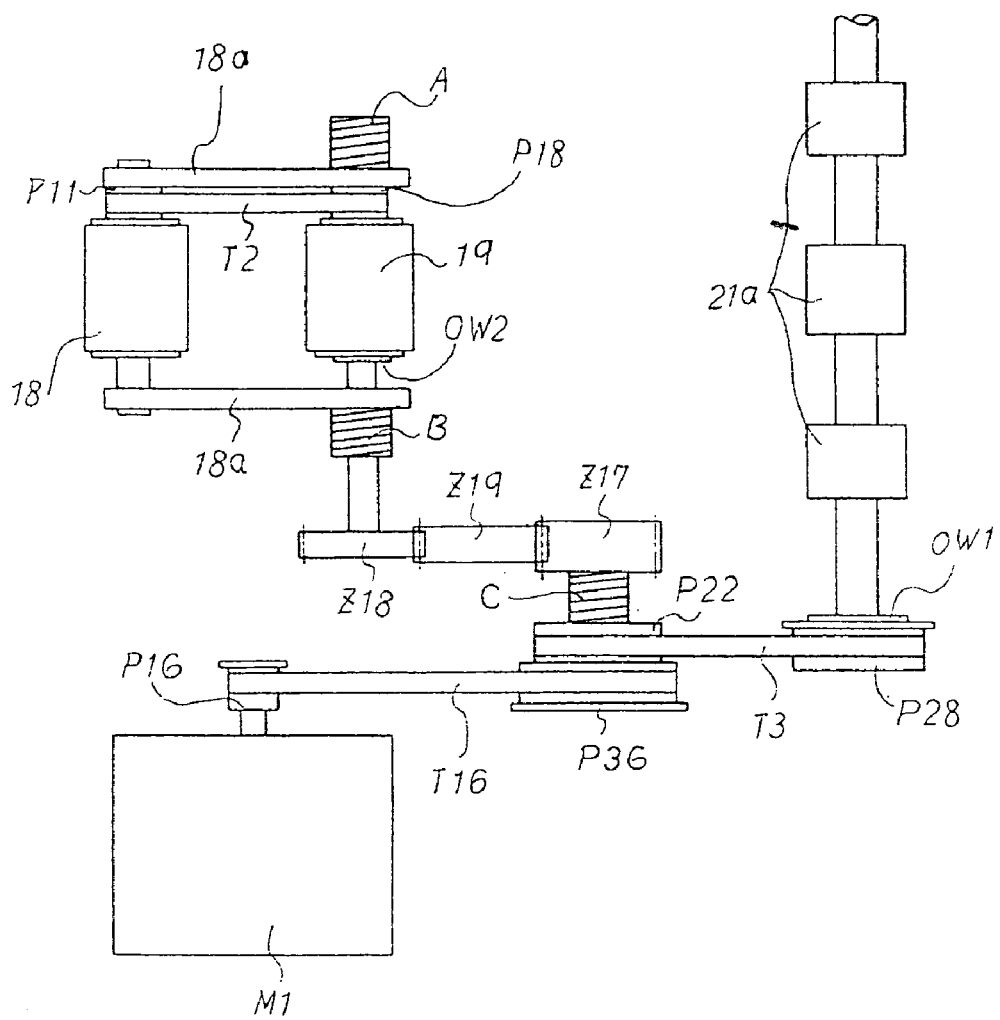
FIG. 5 is a diagram showing parts for driving the automatic document feed device shown in FIG. 1.
Figure 6:
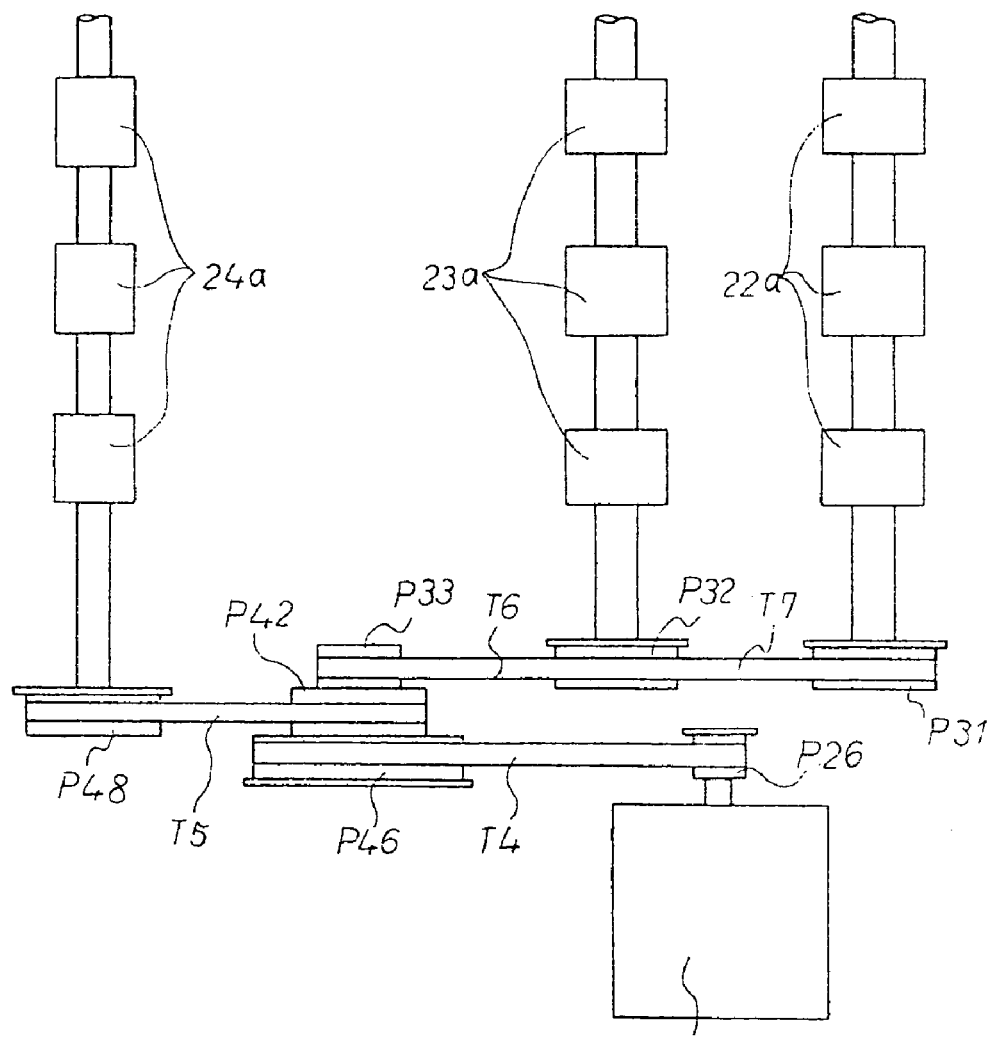
FIG. 6 is a diagram showing parts for driving the automatic document feed device shown in FIG. 1.

The driving structure of each roller will be described with reference to FIGS. 5 and 6. In the automatic document feed device 10, each roller is driven by a feed motor M1 and a conveyer motor M2 which can be driven forward and backward. FIG. 5 shows a drive transmitting system of the feed motor M1, and FIG. 6 shows a drive transmitting system of the conveyer moor M2.

First, in the drive transmitting system of the feed motor M1, as shown in FIG. 5, a forward drive of the feed motor M1 is transmitted to a pulley P36 from a pulley P16 through a timing belt T16. The drive of the pulley P36 is transmitted to a gear Z17, a gear Z19, and a gear Z18 which is attached to a driving shaft of the feed roller 19. Then, the feed roller 19 rotates in a direction to feed the document. A pulley P18 is provided for the driving shaft of the feed roller 19, and drive force is transmitted to the reel roller 18 via a timing belt T2 which is tightly stretched to the pulley P11 which is provided to the shaft of the reel roller 18. One end of an elevating arm 18*a* for supporting the reel roller 18 is attached to the driving shaft of the feed roller 19. The elevating arm 18*a* rotates and the reel roller 18 drops by the rotation of the driving shaft of the feed roller 19 in the feed direction (forward drive of the feed motor M1). Then, when the reel roller 18 comes into contact with the document, the driving shaft of the feed roller 19 is raced to the elevating arm 18*a* by effect of spring clutches A and B. In this case, a resist drive roller 21*a* is connected to a pulley P28 provided to the driving shaft of the resist drive roller 21*a* through a timing belt T3 which is tightly stretched to a pulley P22 provided to the same shaft as that of the pulley P36. The resist drive roller 21*a* does not rotate by effect of a one-way clutch OW1 which is arranged in the pulley P28.

Backward drive of the feed motor M1 is transmitted to the pulley P36 from the pulley 16 through the timing belt T16, and is transmitted to a pulley P28 attached to the shaft of the resist drive roller 21*a* from the pulley P22 provided to the same shaft as that of the pulley P36 through a timing belt T3, thus rotating the resist drive roller 21*a* in the document feed direction. In this case, the backward drive of the feed motor M1 is also transmitted to the driving shaft of the feed roller 19. The elevating arm 18*a* is rotated in the counterclockwise direction and then the reel roller 18 is elevated. However, the feed roller 19 does not rotate by effect of a one-way clutch OW2 provided therein. The elevating arm 18*a* is elevated and is abutted to a restricting member (not shown). The driving shaft of the feed roller 19 is raced to the elevating arm 18*a* by effect of a spring clutch C.

Figure 7:
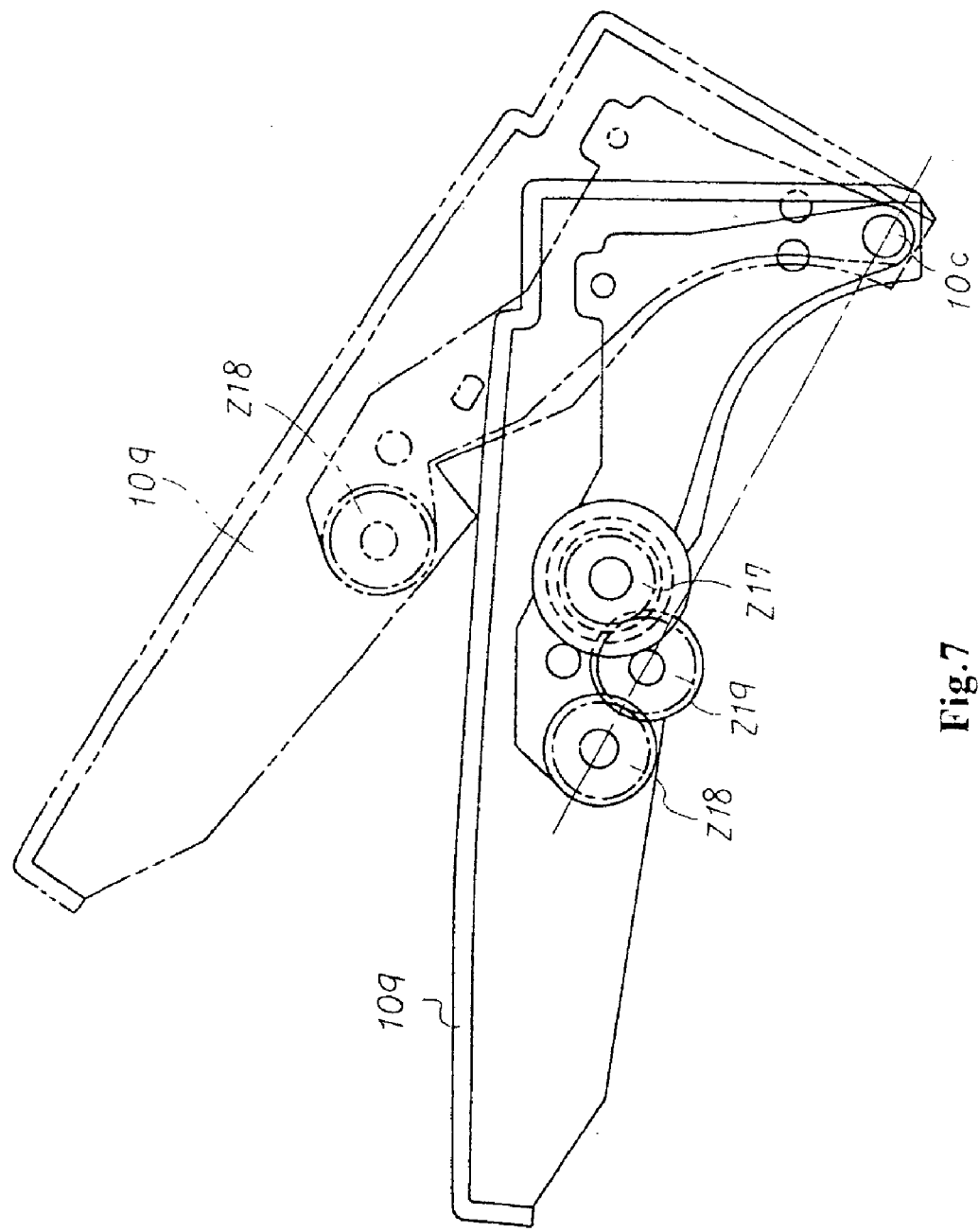
FIG. 7 is a cross-sectional view for illustrating main portions of the automatic document feed device shown in FIG. 1.

With this arrangement, the gear Z18 which is attached to the driving shaft of the feed roller 19 is arranged to the casing 10*a* together with the reel roller 18 and the feed roller 19, thereby realizing their integral rotation. As shown in FIG. 7, the gear Z18 exists away from the gear Z19 by rotating the casing 10*a* and opening the feed path 25. The gear Z18 upon closing the casing 10*a* is meshed with the gear Z19 by closing the feed path 25. The center of the gear Z18 is located at a position on a linear line joining the center of the gear Z19 to a rotational fulcrum 10C of the casing 10*a* (shown by a dotted oblique line in FIG. 7) so that the gear Z18 is meshed with the gear Z19 smoothly and accurately when the feed path 25 is closed. Incidentally, referring to FIG. 7, line and a dotted line show a state in which the casing 10*a* is closed and a state in which it is opened, respectively.

As shown in FIG. 6, in the drive transmitting system of the conveyer motor M2, drive force is transmitted to a pulley P46 from a pulley P26 arranged to the driving shaft of the conveyer motor M2 through a timing belt T4. The drive force is transmitted to a pulley P32 attached to a shaft of a conveying drive roller 23*a* from a pulley P33 provided to the shaft of the pulley P46 through a timing belt T6. Thus, the conveying drive roller 23*a* is rotated forward or backward. In addition, the drive force transmitted to the pulley P32 is transmitted to a pulley P31 attached to the shaft of a conveying drive roller 22*a* via a timing belt T7 and, thus, the conveying drive roller 22*a* is rotated forward or backward. Drive force of the conveyer motor M2 transmitted to a pulley P46 through the timing belt T4 is transmitted to a pulley P48 attached to a shaft of a discharge drive roller 24*a* from the shaft of the pulley P46 via a timing belt T5. Thus, the discharge drive roller 24*a* is rotated forward or backward.

In addition, a solenoid SOL for press and contact as an electromagnetic solenoid is arranged as a drive source to make the pair of discharge rollers 24 spaced from each other. The solenoid SOL for press and contact moves the discharge follower roller 24*b* to be pressed against the discharge drive roller 24*a* by exciting (turning ON) the solenoid SOL for press and contact. By resetting (turning OFF) the excitation of the solenoid SOL for press and contact, the discharge follower roller 24*b* is moved apart from the discharge drive roller 24*a* by effect of an energization spring to energize the discharge follower roller 24*b* to be away from the discharge drive roller 24*a*.

Herein, when the casing 10*a* is rotated and the feed path 25 is opened, an interlock switch stops the driving operation of the feed motor M1 and the conveyer motor M2 for driving each roller and the excitation of the solenoid SOL is off. As mentioned above, the feed motor M1 and the conveyer motor M2 are intermitted and, thus, the security can be ensured when removing the jammed document. Moreover, since the excitation of the solenoid SOL for press and contact is off, the document is not damaged due to the prevention of forcedly pulling out the document from the pair of discharge rollers 24 when the pair of the discharge rollers 24 is located apart from each other and the switch-back path 28 is opened so as to remove the jammed document.

Although the interlock switch is adopted to forcedly shut off the driving operation of the feed motor M1, conveyer motor M2, and solenoid SOL for press and contact as stated above, each motor may be controlled to stop each roller by detecting the opened/closed status of the casing 10a and the solenoid SOL for press and contact can be controlled so that the pair of discharge rollers 24 are far from each other.

The driving operation of the feed motor M1 may be shut off by opening the feed path 25 with an interlock switch which is operated by opening the switch-back path 28. Further, the driving operation of the conveyer motor M2 and the solenoid SOL for press and contact may be stopped by opening the switch-back path 28.

A plurality of sensors S1, S2, and S3 (shown in FIG. 1) are arranged to the feed tray 15 in the document feed direction. The length of the document put on the feed tray 15 is detected by ON/OFF of the sensors S1, S2, and S3. The width of the document put on the feed tray 15 is detected by a volume an output of which changes depending on a moving amount of the side guide 17. Thus, the size of the document is determined by the width, as the detected result, and the length of the document which is detected by the sensors S1, S2, and S3.

In the route for guiding the document, provided are an empty sensor S4 for detecting that the document has been set on the feed tray 15, a resist sensor S5 for detecting the edge of the document that is fed in the feed path 25, a lead sensor S6, provided in front of the contact glass 2, for detecting the edge of the document (shown in FIG. 6), and a discharge sensor S7 for detecting the edge of the document which is discharged from the contact glass 2.

Then, all of the resist sensor S5, lead sensor S6, and discharge sensor S7 for detecting the document transmitted in the route are arranged in a space inside the route like a loop starting from the feed path 25 through the conveyer path 26, the discharge path 27, and the switch-back path 28 and, again, returning to the conveyer path 26. This arrangement needs to ensure no space to which the sensors are attached and the device can be made compact.

Figure 8:
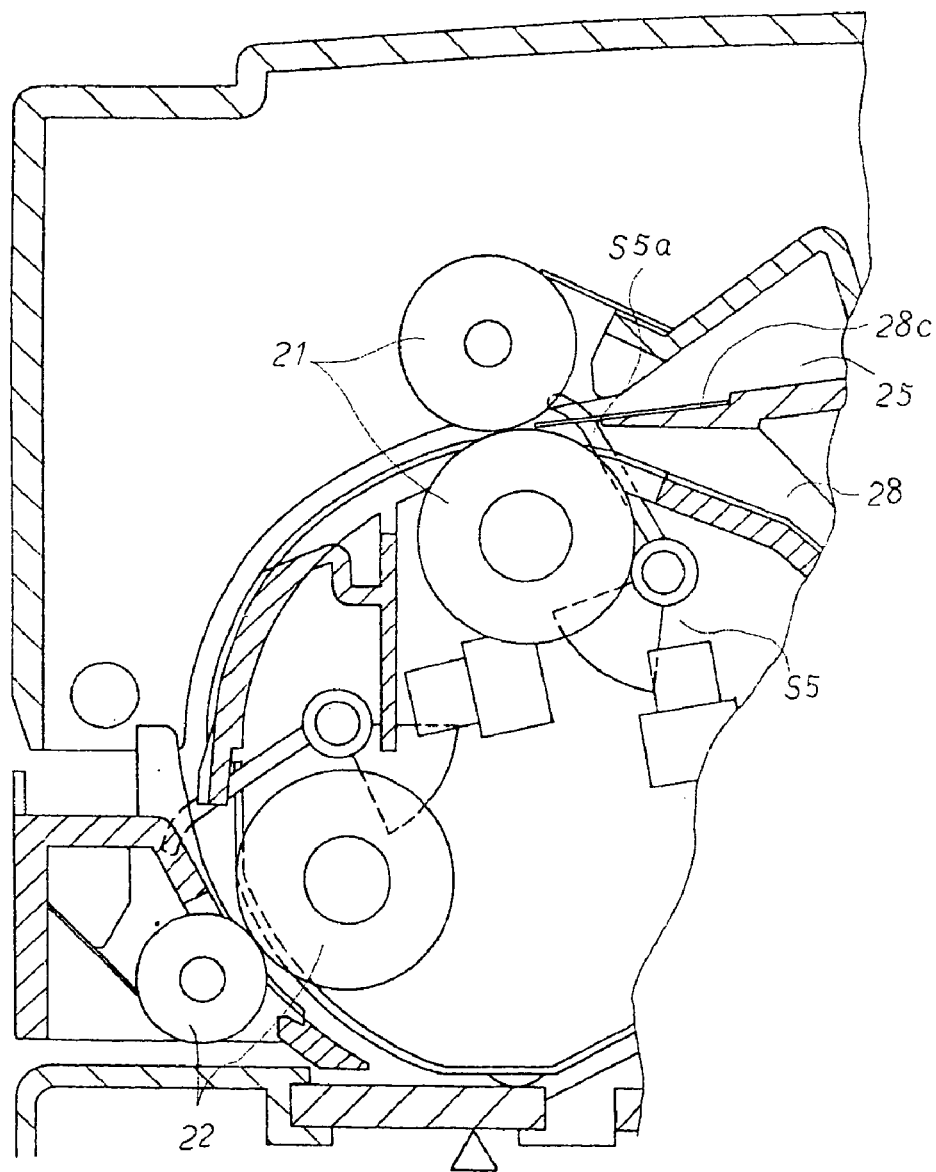
FIG. 8 is a diagram showing a connecting part when a document route is opened/closed in the automatic document feed device show in FIG. 1.
Figure 9:
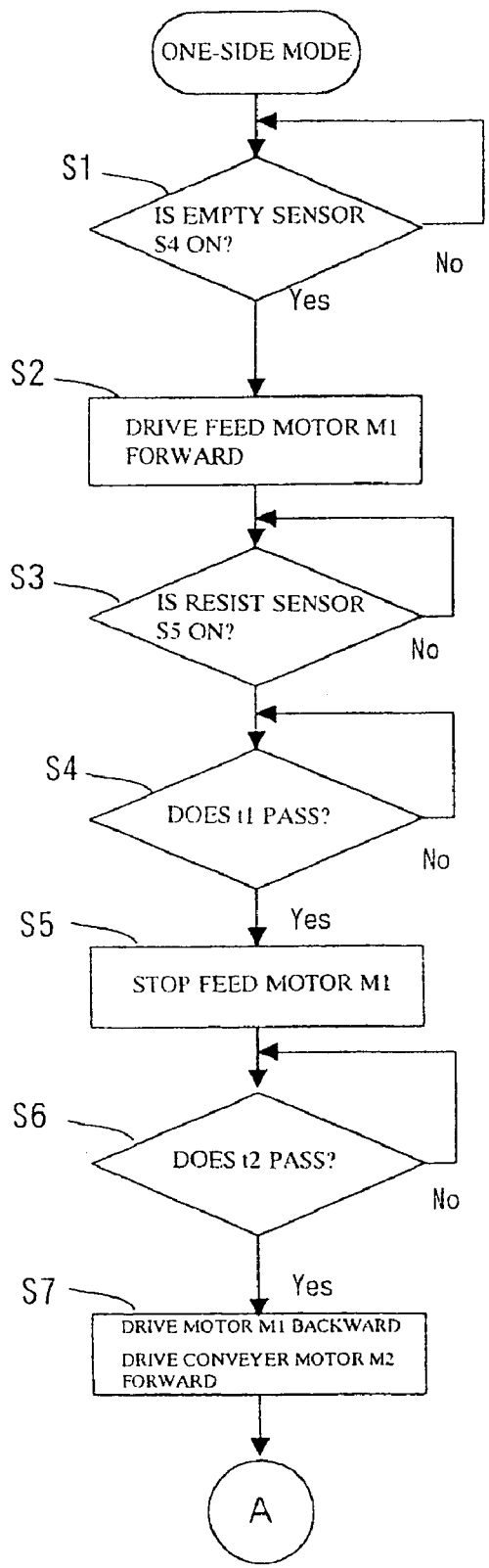
FIG. 9 is a flowchart (1) for control operation of conveyance in a one-side mode in the automatic document feed device shown in FIG. 1.
Figure 10:
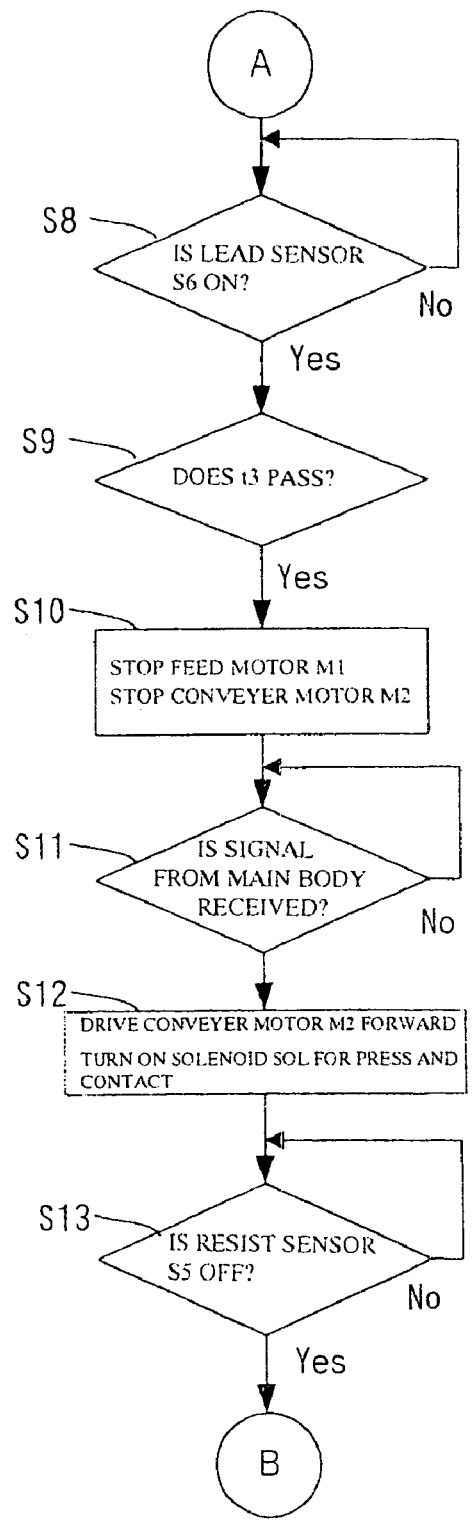
FIG. 10 is a flowchart (2) for control operation of conveyance in the one-side mode in the automatic document feed device shown in FIG. 1.
Figure 11:
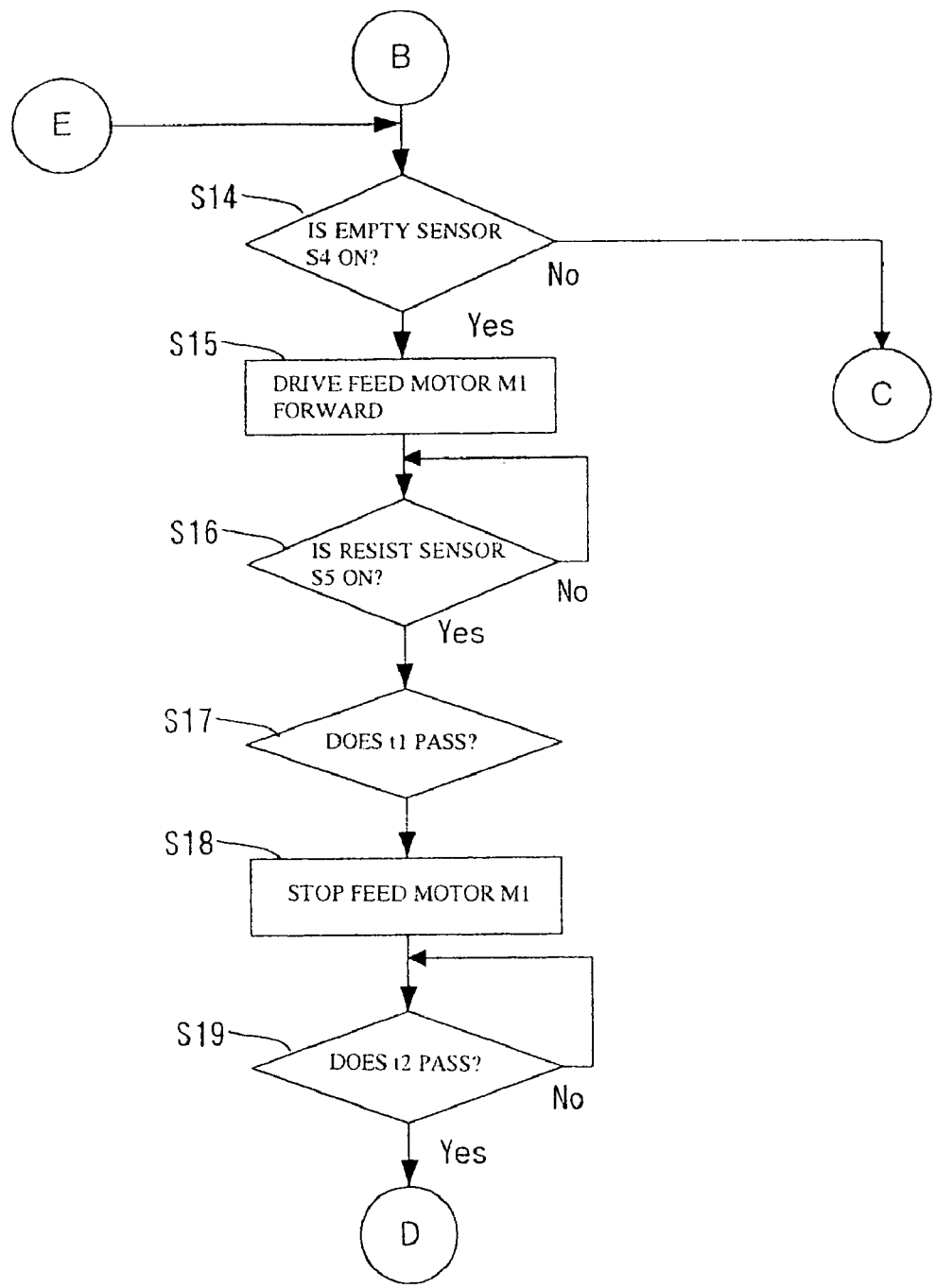
FIG. 11 is a flowchart (3) for control operation of conveyance in the one-side mode in the automatic document feed device shown in FIG. 1.
Figure 12:
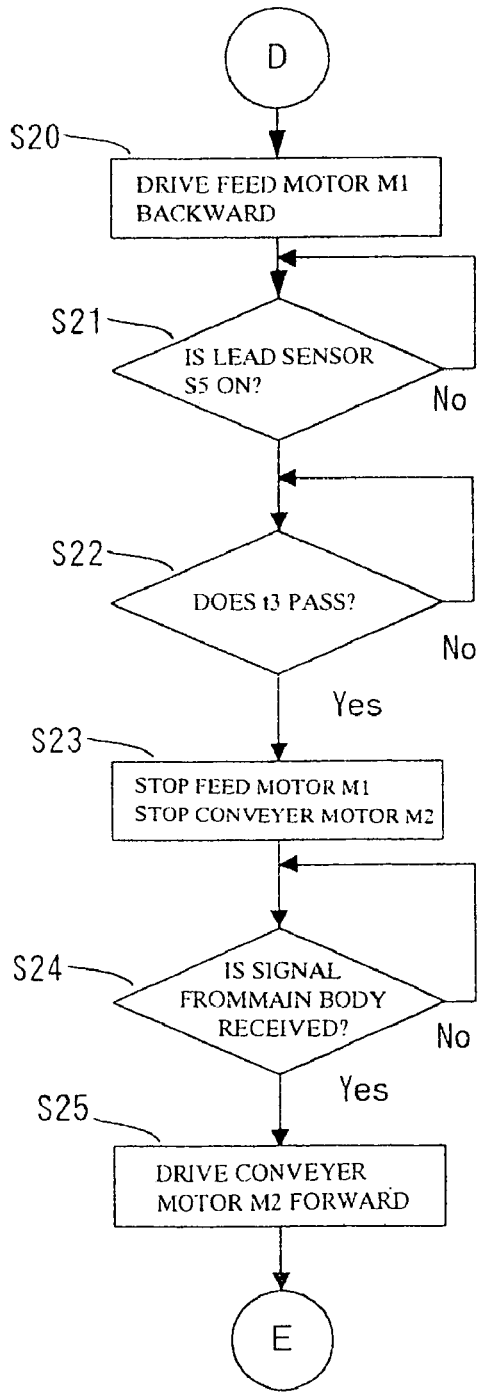
FIG. 12 is a flowchart (4) for control operation of conveyance in the one-side mode in the automatic document feed device shown in FIG. 1.
Figure 13:
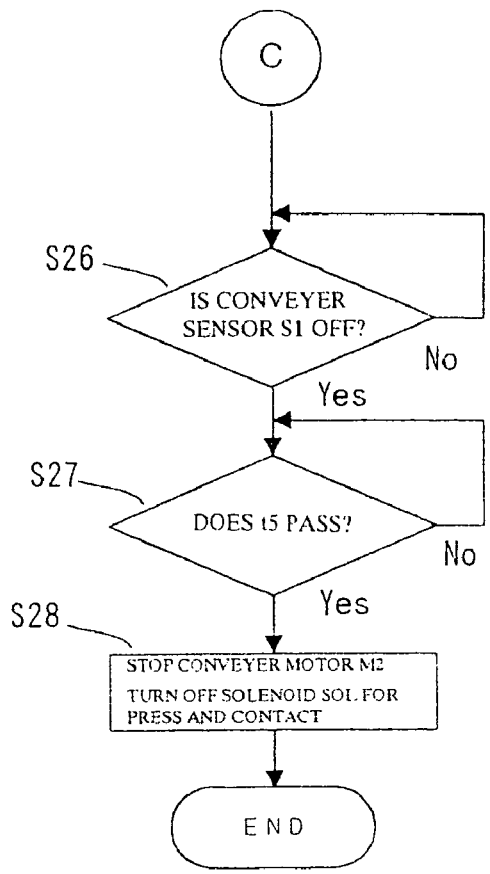
FIG. 13 is a flowchart (5) for control operation of conveyance in the one-side mode in the automatic document feed device shown in FIG. 1.
Figure 14:
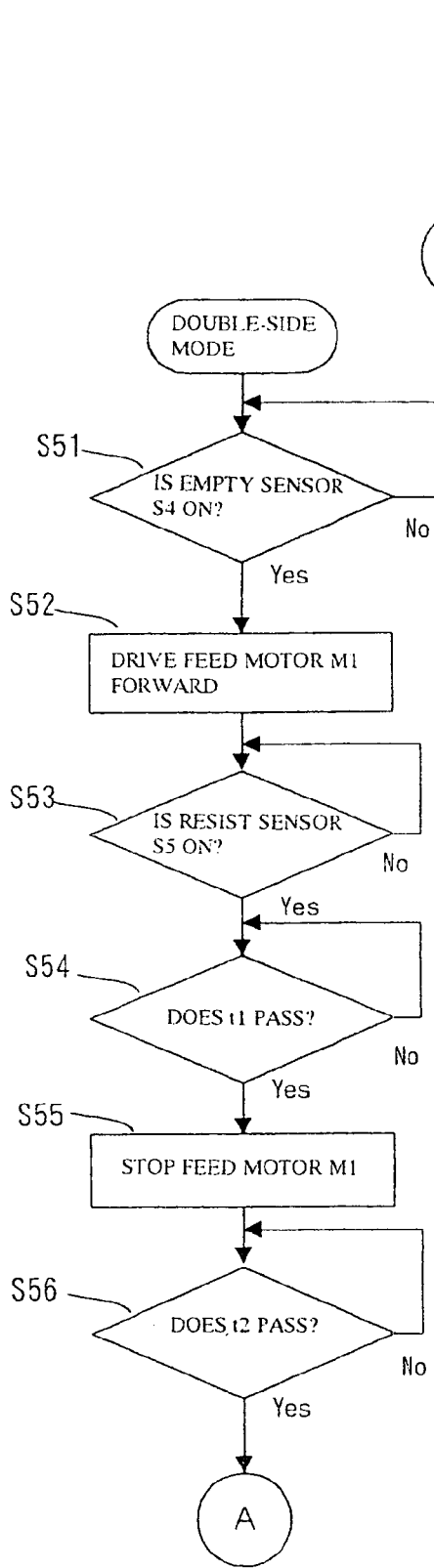
FIG. 14 is a flowchart (6) for control operation of conveyance in the one-side mode in the automatic document feed device shown in FIG. 1.
Figure 15:
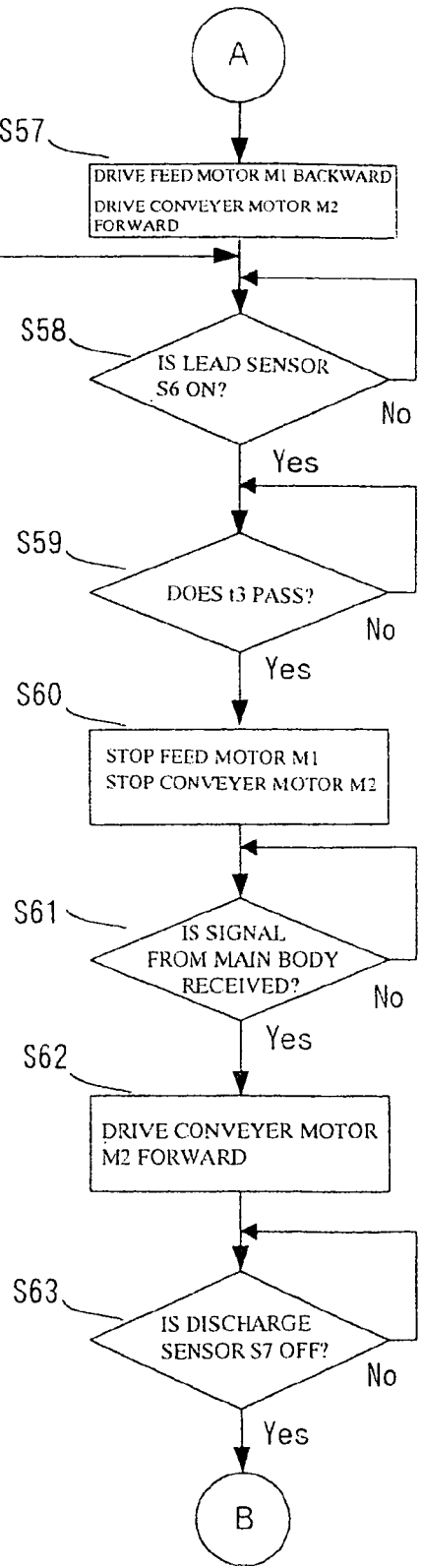
FIG. 15 is a flowchart (7) for control operation of conveyance in the one-side mode in the automatic document feed device shown in FIG. 1.
Figure 16:
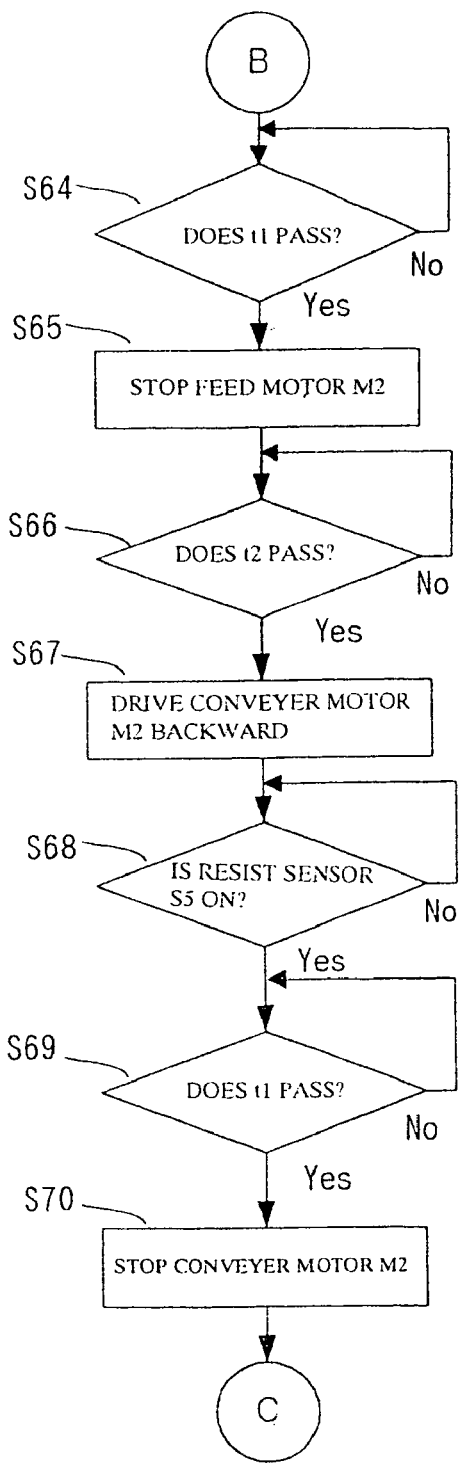
FIG. 16 is a flowchart (8) for control operation of conveyance in the one-side mode in the automatic document feed device shown in FIG. 1.
Figure 17:
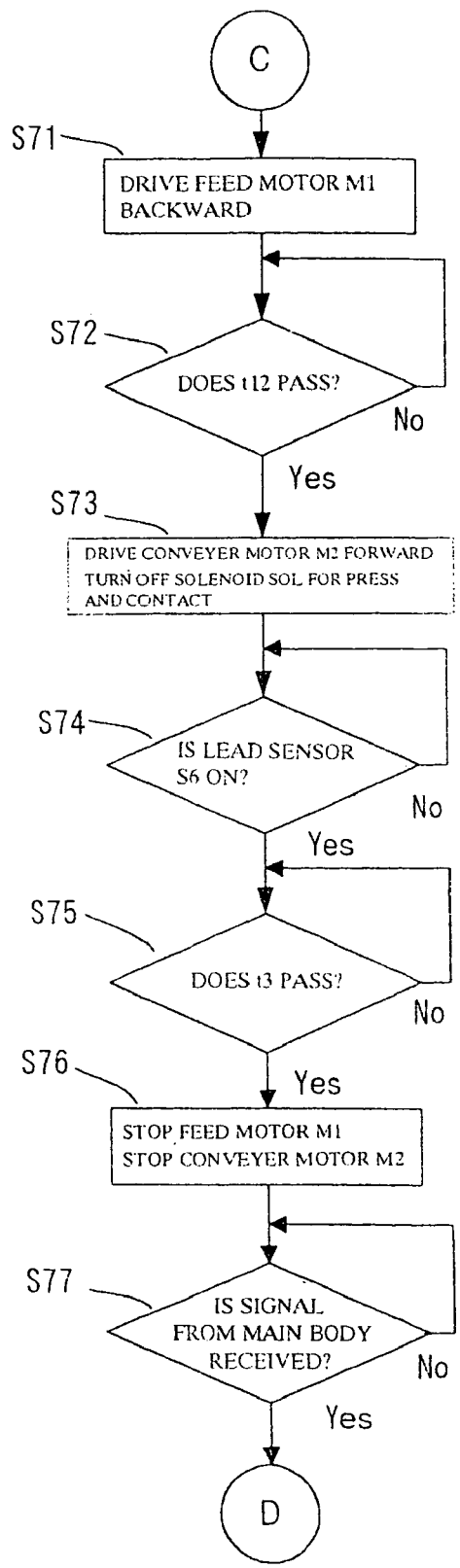
FIG. 17 is a flowchart (9) for control operation of conveyance in the one-side mode in the automatic document feed device shown in FIG. 1.
Figure 18:
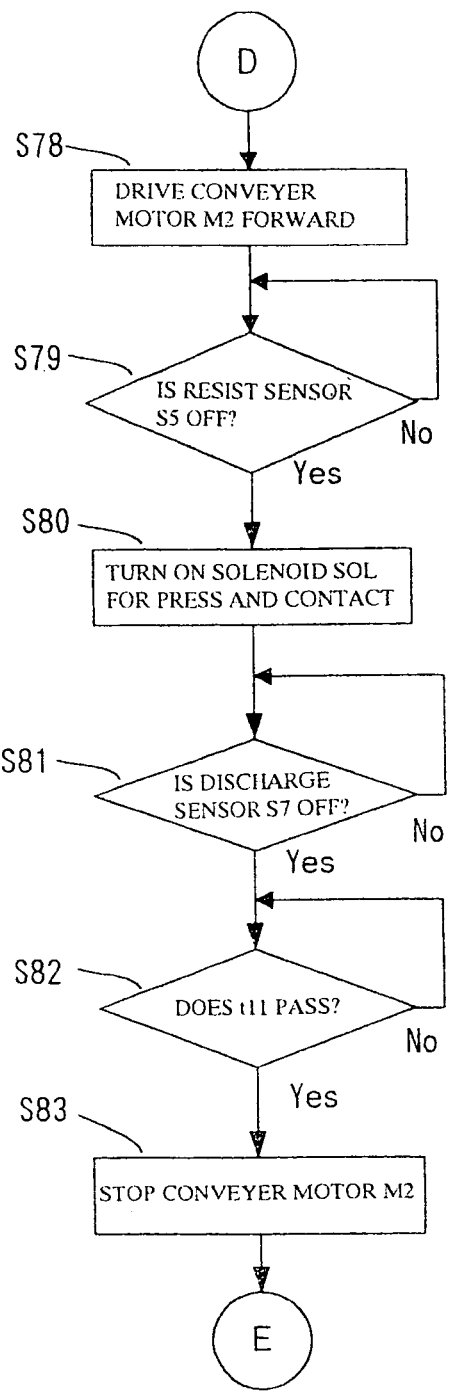
FIG. 18 is a flowchart (10) for control operation of conveyance in the one-side mode in the automatic document feed device shown in FIG. 1.
Figure 19:
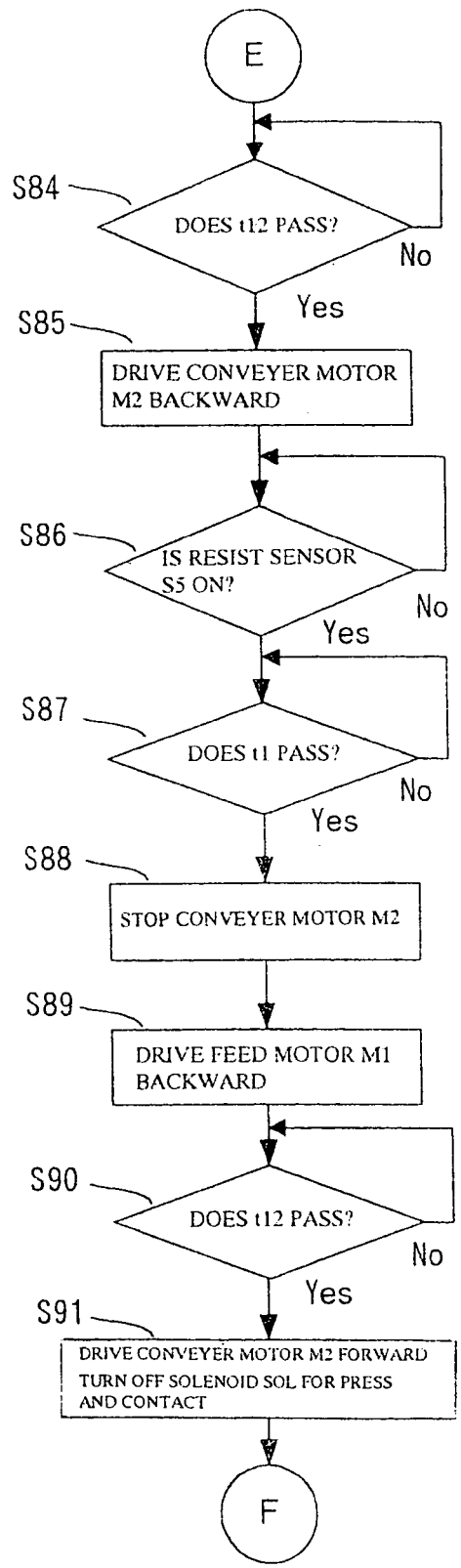
FIG. 19 is a flowchart (11) for control operation of conveyance in the one-side mode in the automatic document feed device shown in FIG. 1.
Figure 20:
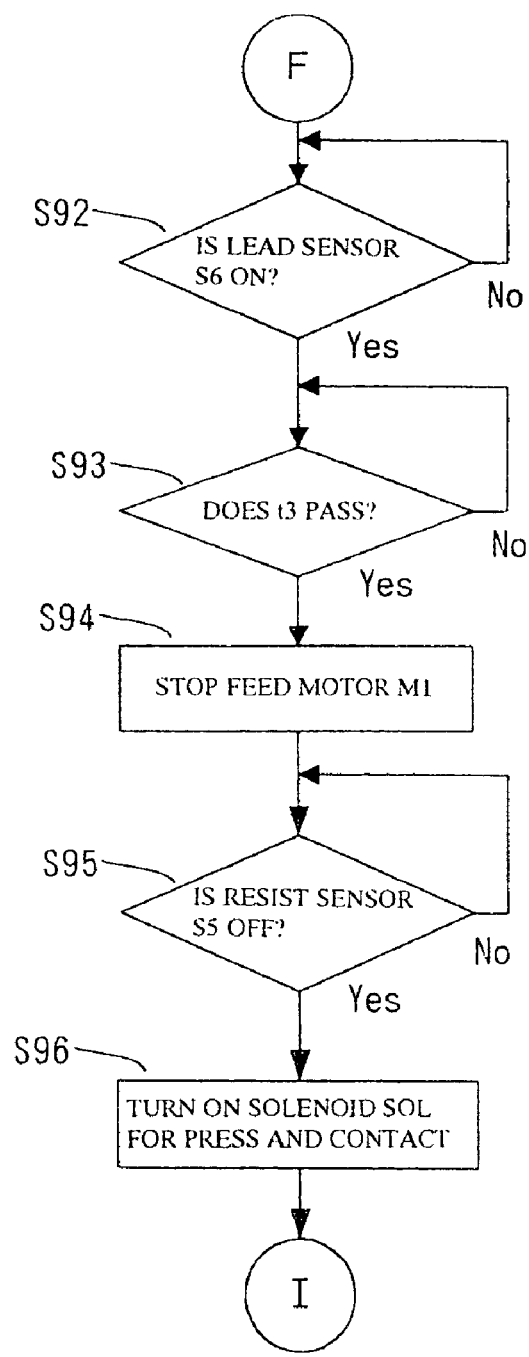
FIG. 20 is a flowchart (12) for control operation of conveyance in the one-side mode in the automatic document feed device shown in FIG. 1.
Figure 21:
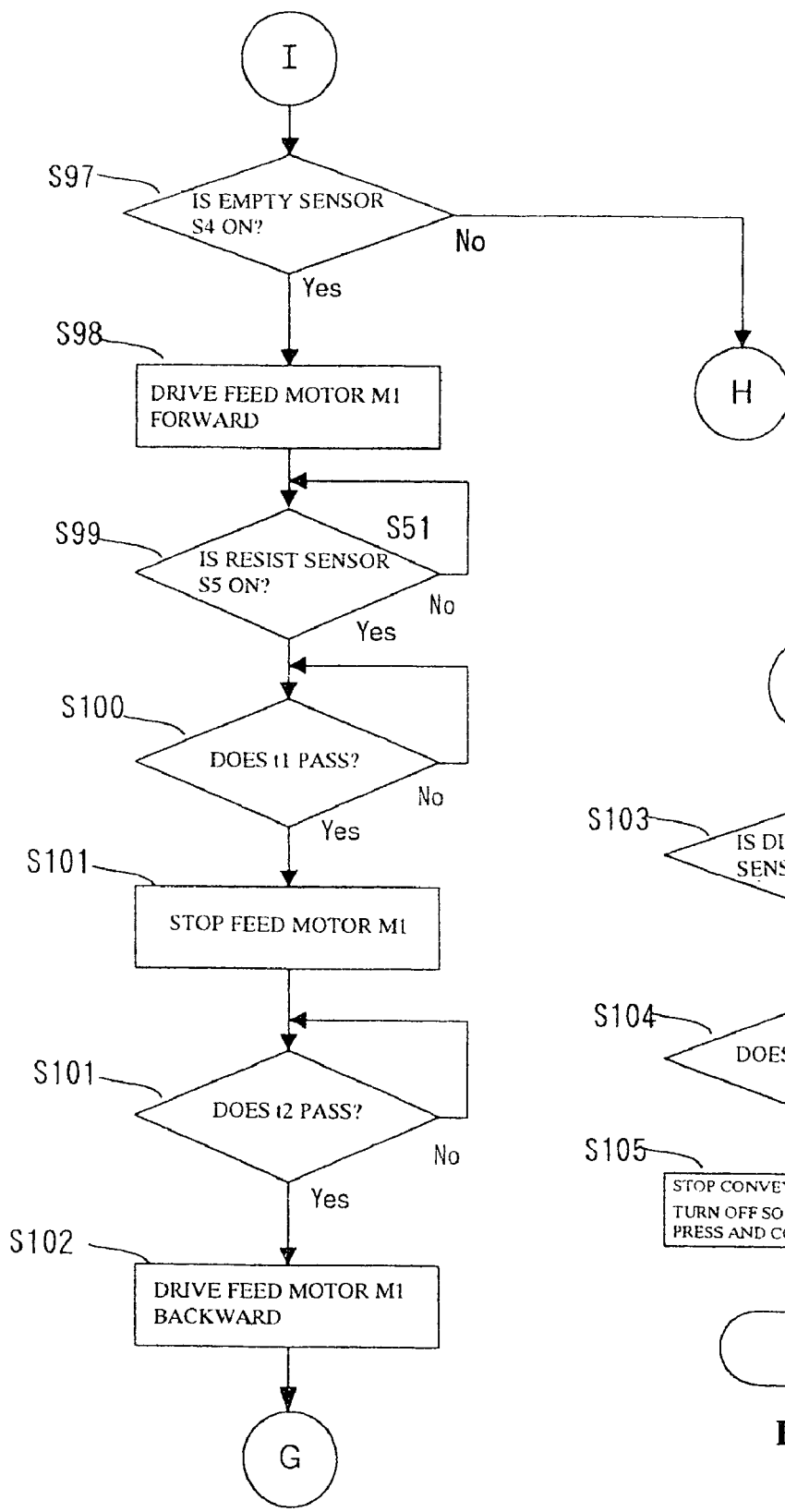
FIG. 21 is a flowchart (13) for control operation of conveyance in the one-side mode in the automatic document feed device shown in FIG. 1.
Figure 22:
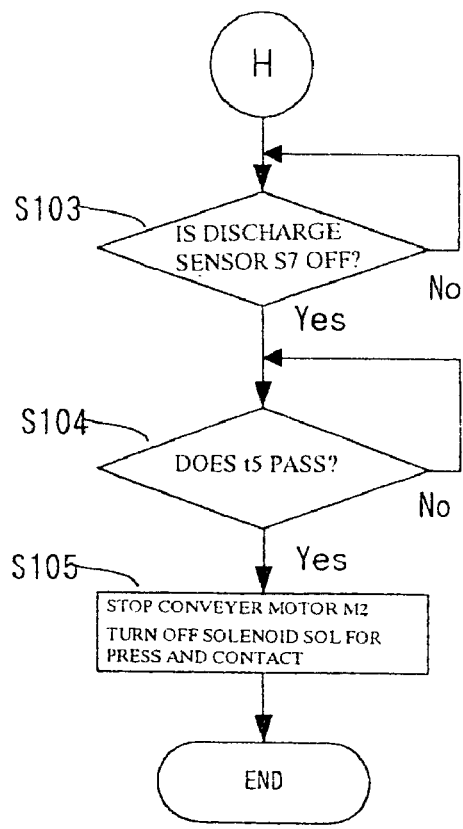
FIG. 22 is a flowchart (14) for control operation of conveyance in the one-side mode in the automatic document feed device shown in FIG. 1.
Figure 23A:
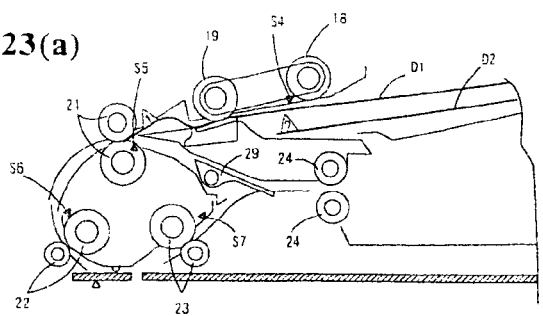
FIGS. 23A to 23E are schematic diagrams showing a conveying status of the document in the one-side mode in the automatic document feed device shown in FIG. 1.
Figure 23B:
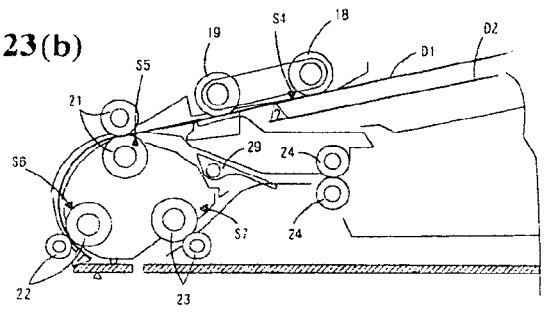
Figure 23C:
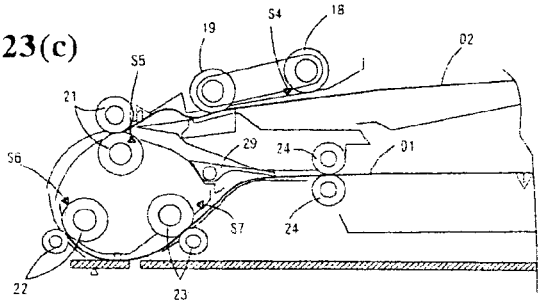
Figure 23D:
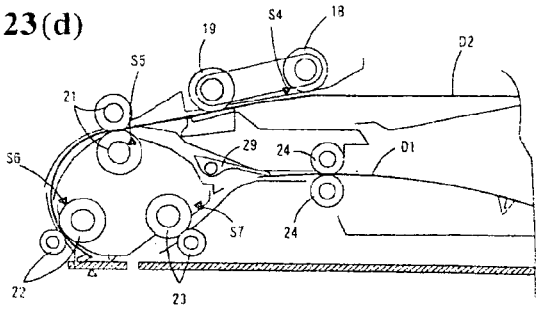
Figure 23E:
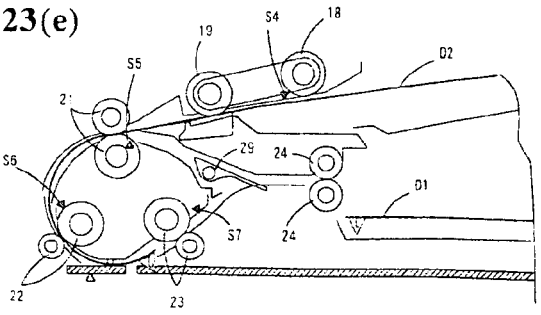
Figure 24A:
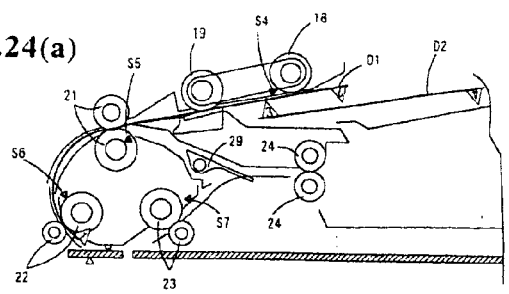
FIGS. 24A to 24F are schematic diagrams showing a conveying status of the document in a double-side mode in the automatic document feed device shown in FIG. 1.
Figure 24B:
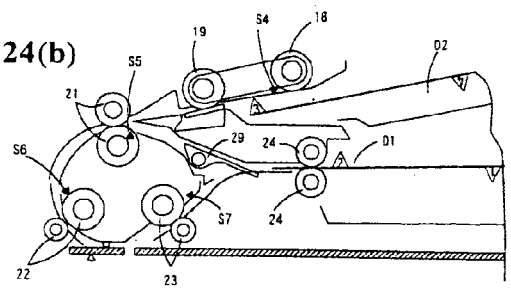
Figure 24C:
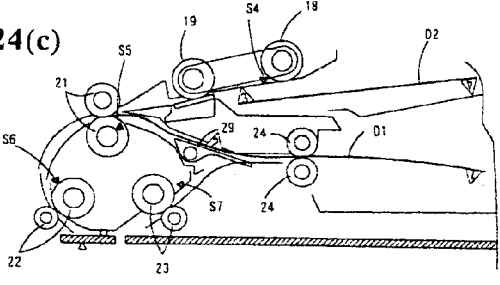
Figure 24D:
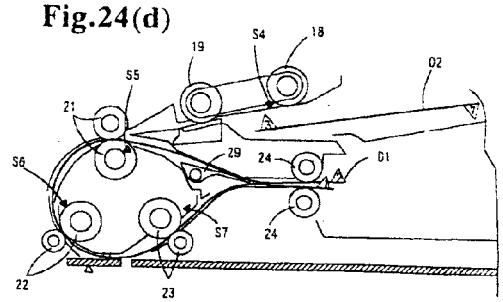
Figure 24E:
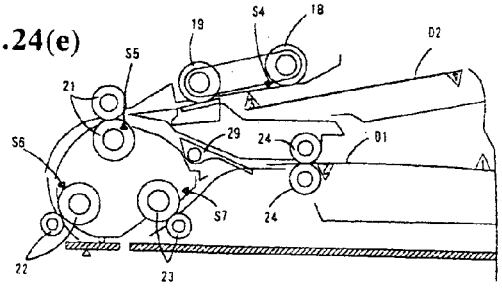
Figure 24F:
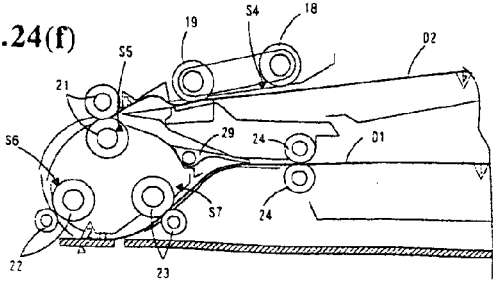
Figure 25:
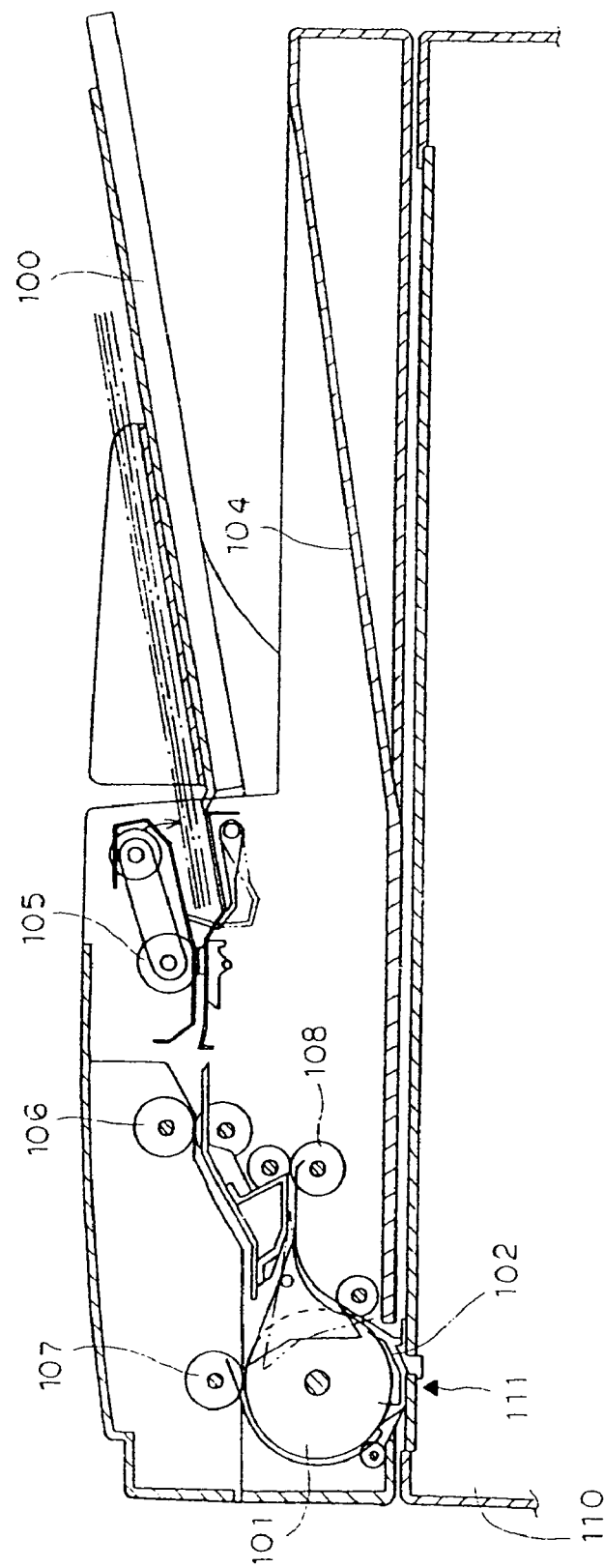
FIG. 25 is a cross-sectional view showing a conventional art of automatic document feed devices.

Herein, the resist sensor S5 uses a lever-type sensor as shown in FIG. 8. A sensor lever S5a of the resist sensor S5 is projected to both the feed path 25 and the switch-back path 28. Since the single sensor can detect both the document sent through the feed path 25 and the document sent through the switch-back path 28 in the above arrangement, the number of sensors used as units can be reduced. Although the present embodiment employs the lever-type sensor as a sensor for detecting the document sent through the feed path 25 and the switch-back path 28, the document in both the above paths can be detected by using a transmission-type sensor.

The sensors S1 to S7 are connected to a CPU for controlling the overall operation for driving the device. Based on detection signals from the sensors S1 to S7, the feed motor M1 and the conveyer motor M2 are driven and the solenoid SOL for press and contact can be excited.

Next, a specific description is given of an operation for controlling the conveyance of the document in the above-structured automatic document feed device with reference to FIGS. 9 to 22. Incidentally, as needed, FIGS. 23A to 24F are referred in which conveyance statuses of the document are schematically shown.

First, a description is given of a one-side mode for reading one side of the document with reference to FIGS. 9 to 13.

In an ON status of the empty sensor S4, that is, when it is detected that the document is set on the feed tray 15, the feed motor M1 is driven forward, thereby feeding a first document D1 (in steps S1 and S2). In this case, the reel roller 18 and the feed roller 19 are rotated in the document feed direction. However, the pair of the resist rollers 21 is not rotated by the effect of the one-way clutch OW1. When the resist sensor S5 detects the edge of the fed document, the feed motor M1 is temporarily stopped after a predetermined time t1 from the detection (in steps S3 to S5). When the feed motor M1 is stopped, the edge of the document is nipped at the nip portion of the pair of resist rollers 21. Thus, a flection is formed, the edge of the document is adjusted, and a skew is removed (refer to FIG. 23A). After the intermission, the feed motor M1 is driven backward, the conveyer motor M2 is driven, and the solenoid SOL for press and contact is excited (in steps S6 and S7). In this case, the reel roller 18 elevates to be separate from the document. The feed roller 19 is intermitted by the effect of the one-way clutch OW2, and the resist drive roller 21a of the pair of resist rollers 21 is rotated in the document feed direction.

The document D1 is carried to the conveyer path 26 from the feed path 25 by the rotation of the feed motor M1 and the conveyer motor M2. When the lead sensor S6 detects the transmission of the edge of the document D1, the feed motor M1 is stopped after a predetermined time t3 passes and the conveyer motor M2 is temporarily stopped (in steps S8 to S10) (refer to FIG. 23B). A read conveying signal is received from the image reading device main body 1 and, then, the conveyer motor M2 is driven again. The front side (one side) of the document D1 is subscanned and read by the reading means (in steps S11 and S12). In this case, the document D1 is conveyed onto the discharge tray 16 to press up the edge of the flapper 29 disposed for closing the discharge path 27.

When the document D1 is transmitted and the resist sensor S5 detects the passage of a bottom edge of the document D1, it is detected whether or not there is a next document in the feed tray 15. If there is a next document in the feed tray 15, a second document D2 starts to be fed, similarly to the manner of the first document D1 (in steps S13 to 15). When the second document D2 is fed, in the above-mentioned manner of the document D1, the feed motor M1 is driven forward, thereby, the reel roller 18 and the feed roller 19 are rotated, the document D2 is nipped at the nip portion of the pair of the resist rollers 21, and a skew is removed (in step S16 to S19) (refer to FIG. 23C). Then, the feed motor M1 is driven backward, the predetermined time t3 passes after the lead sensor S6 detects the edge of the next document, the feed motor M1 is stopped, and the conveyer motor M2 is also stopped (in steps S20 to S23). Herein, the document D2 is stopped so that the edge thereof is in front of the contact glass 2. The first document D1 is stopped by nipping the bottom edge thereof between the pair of discharge rollers 24 (refer to FIG. 23D).

A reading and conveying signal is received from the image reading apparatus main body 1 and, then, the conveyer motor M2 is driven again. The front side of the document D2 is subscanned and read by the above reading means (in steps S24 and 25). During the reading operation of the second document D2, the first document D1 is discharged onto the discharge tray 16 (refer to FIG. 23E).

When the resist sensor S5 detects that the bottom edge of the document D2 is transmitted, the empty sensor S4 checked to see if there is a next document. If it is detected that there is a next document, similarly to the manner of the second document D2, a third document D3 starts to be fed. Thereafter, so long as the empty sensor S4 detects that there is an document (in steps S14 to S25), documents D4, D5, . . . are subjected to the above-described processes.

In the case of the final document, in step S14, the empty sensor S4 enters the OFF status, a predetermined time t5 for discharging the document to the discharge tray 16 passes after the discharge sensor S7 detects the bottom edge of the final document, the conveyer motor M2 is stopped, the excitation of the solenoid SOL for press and contact is off, and a process for all documents ends (in step S26 to S28).

Next, a description is given of a double mode for reading one side of the document with reference to FIGS. 14 to 22.

In the above-described manner in steps S1 to S10 in the one-side mode, the empty sensor S4 detects that the documents are set on the feed tray 15, the feed motor M1 is driven forward, thereby rotating the reel roller 18 and the feed roller 19, a first document D1 is nipped at the nip portion between the pair of the resist rollers 21, and a skew is removed. The first document D1 is conveyed by the backward driving of the feed motor M1 and the forward driving of the conveyer motor M2. The edge of the first document D1 is detected by the lead sensor S6. After that, the feed motor M1 and the conveyer motor M2 are temporarily stopped and, thus, the document D1 is stopped so that the edge thereof is in front of the contact glass 2. In this case, the solenoid SOL for press and contact is excited and the pair of discharge rollers 24 are pressed and in contact (in steps S51 to S60) (refer to FIG. 24A).

The reading and conveying signal is received from the image reading apparatus main body 1 and, then, the conveyer motor M2 is driven forward. Thereby, the front side of the document D1 is transmitted onto the contact glass 2, and is subscanned and read by the reading means. The document D1 through the reading process by the contact glass 2 is guided to the discharge path 27 (in steps S61 and S62).

The document D1 guided to the discharge path 27 is conveyed onto the discharge tray 16 to press up the edge of the flapper 29 disposed for closing the discharge path 27. In the conveyed state, the discharge sensor 27 detects the bottom edge of the document D1. After a predetermined time t11 for the transmission of the bottom edge of the document D1 through the flapper 29, the conveyer motor M2 is stopped. The document D1 is stopped by nipping the bottom edge thereof between the pair of discharge rollers 24 (in steps S63 to 65) (refer to FIG. 24B).

Thereafter, the conveyer motor M2 is driven backward (in steps S66 and 67). Thus, the discharge drive roller 24a is rotated backward, and the document D1 is switched and transmitted to backward. In association with the transmission, the document D1 is guided into the switchback path 28 along an document leading surface of the flapper 29 which is moved to close the discharge path 27. After the resist sensor S5 detects the edge of the document D1 which is guided to the switch-back path 28, a flection is formed at the nip portion between the pair of the resist rollers 21, a skew is removed, the conveyer motor M2 driven backward is stopped after a predetermined time t1 (in steps S68 to S70) (refer to FIG. 24C). Although in the embodiment of the present invention, the pair of discharge rollers 24 simultaneously functions as switch-back rollers for switching the document to back, the switch-back rollers can be independently provided.

To feed the document D1 again, the feed motor M1 is driven backward (in step S71). The resist drive roller 21a is rotated in the document feed direction by the backward driving of the feed motor M1. After a predetermined time t12 for certainly nipping the edge of the document D1 between the pair of resist rollers 21, the excitation of the solenoid SOL for press and contact is turned off. The discharge follower roller 24b is moved downward, it is thus made separate from the discharge drive roller 24a, and the conveyer motor M2 is driven forward (in steps S72 and S73).

The document D1 is reversed and fed along the feed path 25. When the edge of the document D1 is detected by the lead sensor S6, the conveyer motor M2 is stopped after the predetermined time t3 and the feed motor M1 is stopped (in steps S74 to 76). Then, the conveyer motor M2 is driven again by the reading and conveying signal from the image reading apparatus main body 1, and the back side of the document D1 is subscanned and read by the reading means (in steps S77 and S78). In this case, the top edge of the document D1 to be transmitted to the discharge tray 16 crosses to the bottom edge of the document D1 to be re-fed in a common portion between the discharge path 27 including the pair of discharge rollers 24 and the switch-back path 28. Since the discharge drive roller 24a is apart from the discharge follower roller 24b, the document D1 can be carried without fail (refer to FIG. 24D).

Thereafter, the resist sensor S5 detects the bottom edge of the document D1, then, the solenoid SOL for press and contact is excited, and the pair of discharge rollers 24 is pressed and contact with each other. The predetermined time t11 passes after the discharge sensor S7 detects the bottom edge of the document D1 and, then, the conveyer motor M2 is stopped. The bottom edge of the document D1 is nipped between the pair of discharge rollers 24 (in steps S79 to S83) (refer to FIG. 24E).

To arrange pages in numerical order and discharge the documents to the discharge tray 16, the conveyer motor M2 is driven backward, the edge of the document D1 is nipped at the nip portion between the pair of resist rollers 21 in the switch-back path 28, and a skew is removed. The document D1 is reversed and fed along the feed path 25 by the backward driving of the feed motor M1. The lead sensor S6 detects the edge of the document D1, thereby stopping the feed motor M1 (in steps S84 to S90).

The conveyer motor M2 is driven forward, the excitation of the solenoid SOL for press and contact is off, and the document D1 is conveyed onto the contact glass 2. Herein, the document D1 is not stopped in front of the contact glass 2 and is carried to the discharge path 27 because the document D1 is not read by scanning (in steps S91 to S94).

During the process for carrying the document D1 to the discharge path 27, the resist sensor S5 detects the bottom edge of the document D1 (in step S95). Then, the solenoid SOL for press and contact is excited, thereby, the pair of discharge rollers 24 is pressed and contact with each other, and it is checked whether or not there is an document in the feed tray 15 (in step S96). If there is a second document D2, it starts to be fed in the same manner as that of the first document D1.

Steps of controlling the feed operation of the second document D2 are performed similarly to the document D1. In other words, the reel roller 18 and the feed roller 19 are rotated by the forward driving of the feed motor M1. The document D2 is abutted at the nip portion between the pair of resist rollers 21 and a skew is removed (in steps S94 to S101) (refer to FIG. 24F).

The feed motor M1 is driven backward and the document D2 is transmitted along the feed path 25. The first document D1 is discharged to the discharge tray 16 during the operation for reading the second document D2 (in step S102).

Sequentially, in the above manner of the first document D1, the second document D2 is processed in control steps S58 to S96. So long as the empty sensor S4 detects that there is an document, documents D3, D4, . . . , are similarly processed.

Incidentally, in step S100, since the empty sensor S4 is in the Off status, the discharge sensor S7 detects the final document. Then, after the predetermined time t5 for discharging the final document to the discharge tray 16, the conveyor motor M2 is stopped. The excitation of the solenoid SOL for press and contact is off and the processes for all documents end (in steps S103 to S105).

In the present embodiment, the document feed route is structured so that at the single position, the edge of the document fed from the feed tray is adjusted to that of the document which is switched back and is fed again. Consequently, the document feed route is shortened and simplified, thereby enabling efficient conveyance.

In the present embodiment, the up-guide plate 25a is fixed to the casing 10a and, by the integral rotation thereof in the counterclockwise direction, it can be opened/closed. Further, the reel roller 18, feed roller 19, follower roller 21b of the pair of resist rollers 21 are arranged to the casing 1a, and are integrally rotated. As a consequence, the feed path 25 is successively exposed and opened, entirely from the feed port of the feed path 25 to the contact glass 2. The jammed document can be easily removed from the feed path 25.

The up guide for switch back 28a and the down guide for feed 25b are integrally formed, and the integrated guides are rotatably supported. In addition, since the separate pat 20 and the energizing spring 20a thereof are attached to the integrated guides, thereby realizing the integral rotation. The switch-back path 28 is sequentially exposed and opened, completely from the pair of discharge rollers 24 to the pair of resist rollers 21. The jammed document can be easily removed from the switch-back path 28 Further, the excitation of the solenoid SOL for press and contact is off and the pair of discharge rollers 24 is located apart from each other by opening the casing 10a. Therefore, there is not any danger in that the document is not damaged when removing the jammed document from the path for switch back 28.

As discussed above, according to the present invention, if the document is jammed in any portion of the document transmitting path, the status of the document nipped between the pair of carrying and transmitting rollers is set. The jammed document can be easily removed without damaging the document.

The adjusting position of the edge of the document is a branch position between the feed path for guiding the document fed from the feed tray and the switch-back path for guiding the document which is switched back and transmitted. Therefore, the feed path and the switch-back path can be made almost linear upstream of the adjusting position. The document can be adjusted without fault. Moreover, a flexible film member is provided at the branch position to lead the edge of the document to the adjusting position. Accordingly, the edge of the document can be certainly led to the adjusting position, thus ensuring the adjustment of the document.

What is claimed is:

1. An automatic document feed device for reading one side of a document to be conveyed, reversing and re-feeding said document onto a platen, and reading the other side of said document at a reading position on said platen, comprising:
   a feed tray for setting said document;
   a separating means for separating and feeding said document one by one set on said feed tray;
   a feed path for guiding said document fed by said separating means to read one side of said document on said platen;
   a re-feed path for guiding said document one side of which is read to re-feed said document onto said platen; and
   two resist rollers for adjusting an edge of said document which is guided along said feed path to read one side of said document and also for adjusting said edge of said document which is guided along said re-feed path to read the other side of said document, wherein said two resist rollers are positioned near the downstream of said separating means and at a junction point of said feed path and said re-feed path,
   wherein said two resist rollers are in contact with each other.

2. A device according to claim 1, wherein rotation of said two resist rollers are controlled selectively for feeding said document or for stopping to adjust said edge of said document.

3. A device according to claim 2, wherein said two resist rollers adjust said document by abutting said edge of said document at a nip portion of said two resist rollers.

4. A device according to claim 3, further comprising a guide member, positioned between said feed path and said re-feed path arranged under said feed path, for guiding said edge of said document along said feed path and said re-feed path to said nip portion of said two resist rollers.

5. An automatic document feed device for reading one side of a document to be conveyed, reversing and re-feeding said document onto a platen, and reading the other side of said document at a reading position on said platen, comprising:
   a feed tray for setting said document;
   a discharge tray, positioned under said feed tray, for receiving said document which is read at said reading position;
   a separating means for separating and feeding said document one by one set on said feed tray;
   a feed path for feeding said document fed by said separating means onto said platen;
   a switch-back path, positioned between said feed tray and said discharge tray, for reversing said conveying direction of said document one side of which is read on said platen and for guiding said document into said feed path; and
   two resist rollers which are in contact with each other, positioned near the downstream of said separating means and at a junction point of said switch-back feed path and said re-feed path,
   wherein said two resist rollers adjust an edge of said document which is fed along said feed path by said separating means onto said platen to read one side of said document, and re-feed said document onto said platen after adjusting the edge of said document which is guided along said switch-back path to read the other side of said document.

6. A device according to claim 5, further comprising:
   a first loop space, provided in said feed path, for bending the document by abutting the edge of the document guided in said feed path to said pair of resist rollers; and
   a second loop space, provided in said switch-back path, for bending the document by abutting the edge of the document guided in said switch-back path to said two resist rollers.

7. A device according to claim 6, wherein said first loop space and said second loop space are formed to make the document bending toward the outside.

8. A device according to claim 5, further comprising:
   a flexible lead member, provided between said feed path and said switch-back path, for leading said document to a nip portion of said two resist rollers, the edge of the document guided in said feed path and the edge of the document guided in said switch-back path.

9. An automatic document feed device for reading one side of a document to be conveyed, reversing and re-feeding the document onto a platen, and reading the other side of the document at a reading position on said platen, comprising:
- a feed tray for setting a document;
- a discharge tray for receiving said document which is read at said reading position;
- a feed path for guiding said document set on said feed tray onto said platen;
- a separating means having a feed roller for feeding said document set on said feed tray and a separate path for separating said document one by one being pressed by said feed roller against said separate path;
- a conveyer path, connected to said feed path, for guiding said document onto said reading position on said platen;
- a first and second conveyer rollers, positioned respectively downstream and upstream of said reading position, for conveying the document along said conveyer path;
- a discharge path for guiding said document read at said reading position to said discharge tray;
- a pair of switch-back rollers which can rotate forward and backward for discharging said document to said discharge tray along said discharge path and for reversing said document which is conveyed into said discharge path and re-feeding said document into said feed path;
- a switch-back path for guiding said document which is re-fed by said pair of switch-back roller to said feed path;
- means for separating said pair of switch-back rollers apart from each other to convey said document without fail when said document is circulated from said switch-back path to said feed path and the top and bottom edges of said document cross; and
- two resist rollers, positioned at a junction point of said feed path and said switch-back path, for adjusting an edge of said document which is fed by said feed roller and for adjusting the edge of said document to be re-fed along said switch-back path by said pair of switch-back rollers, wherein said two resist rollers are in contact with each other.

10. A device according to claim 9, wherein said feed roller is driven by a first drive motor, and said pair of switch-back rollers are driven by a second drive motor.

11. A device according to claim 10, wherein said first drive motor drives said feed roller by a forward rotation and also drives said two resist rollers by a backward rotation, and said second drive motor drives said first and second conveyer rollers and said pair of switch-back rollers forward and backward.

12. A device according to claim 9, further comprising:
- detecting means, positioned upstream of said two resist rollers, for detecting said document fed by said feed roller and for detecting said document conveyed by said pair of switch-back rollers; and
- control means for controlling the driving of said pair of switch-back rollers by detecting the edge of the document by said detecting means.

13. An automatic feed device for reading one side of a document to be conveyed, reversing and re-feeding the document onto a platen, and reading the other side of the document at a reading position on said platen, comprising:
- a feed path for guiding said document one side of which is to be read on said platen; and
- a re-feed path for guiding said document one side of which is read and for reversing and re-feeding said document into said feed path, wherein the length of a loop path for said document to circulate along said re-feed path, said feed path, and said platen and to return to said re-feed is formed shorter than the length of said document, and further comprising:
- two resist rollers, positioned downstream of said separating means, for adjusting an edge of said document which is guided along said feed path to read one side of said document to be fed and also for adjusting said edge of said document which is guided along said re-feed path to read the other side of said document to be fed, wherein said two resist rollers are in contact with each other.

* * * * *